United States Patent
Opshaug et al.

(10) Patent No.: US 10,757,713 B2
(45) Date of Patent: Aug. 25, 2020

(54) ORTHOGONALITY AND ENCAPSULATION FOR POSITIONING AND NAVIGATION SIGNALS

(71) Applicant: QUALCOMM Incorporated, San Diego, CA (US)

(72) Inventors: Guttorm Ringstad Opshaug, Redwood City, CA (US); Rayman Wai Pon, Cupertino, CA (US); Jie Wu, San Diego, CA (US); Naga Bhushan, San Diego, CA (US); Sven Fischer, Nuremberg (DE); Stephen William Edge, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 60 days.

(21) Appl. No.: 16/046,253

(22) Filed: Jul. 26, 2018

(65) Prior Publication Data

US 2019/0313416 A1    Oct. 10, 2019

Related U.S. Application Data

(60) Provisional application No. 62/655,546, filed on Apr. 10, 2018.

(51) Int. Cl.
*H04W 72/08* (2009.01)
*H04L 5/00* (2006.01)
(Continued)

(52) U.S. Cl.
CPC ......... *H04W 72/082* (2013.01); *H04L 5/0007* (2013.01); *H04W 4/02* (2013.01);
(Continued)

(58) Field of Classification Search
None
See application file for complete search history.

(56) References Cited

U.S. PATENT DOCUMENTS

2015/0141048 A1    5/2015  Woo et al.
2016/0065342 A1    3/2016  Mirbagheri et al.
(Continued)

FOREIGN PATENT DOCUMENTS

EP        3282783 A1    2/2018

OTHER PUBLICATIONS

Sven Fischer, Observed Time Difference of Arrival (OTDOA) Positioning in 3GPP LTE, Jun. 6, 2014 (Year: 2014).*

(Continued)

*Primary Examiner* — Alex Skripnikov
*Assistant Examiner* — Sharmin Chowdhury
(74) *Attorney, Agent, or Firm* — Kilpatrick Townsend & Stockton, LLP

(57) ABSTRACT

Mobile devices often use orthogonal frequency division multiplexing (OFDM) to calculate position information of mobile devices within the network. However, physical distance between the mobile device and a signal source for positioning and other environmental factors can influence the signal strength of received signals. Received signals at the mobile device that are stronger may drown out the weaker signals, particularly when two signal sources occupy the same symbol. In traditional OFDM, a signal source transmits the same symbol for each positioning occasion, so a weaker signal may never be detected over a stronger signal, reducing the accuracy of the positioning calculations. Described herein are systems and methods for using a pattern to vary the designated symbol for each signal source in a wireless network so that a weaker signal from a signal source may be detected on at least some of the positioning occasions.

34 Claims, 10 Drawing Sheets

(51) Int. Cl.
  *H04W 72/04*  (2009.01)
  *H04W 4/02*  (2018.01)
  *H04W 88/08*  (2009.01)
(52) U.S. Cl.
  CPC ... *H04W 72/0446* (2013.01); *H04W 72/0453* (2013.01); *H04W 88/08* (2013.01)

(56) References Cited

U.S. PATENT DOCUMENTS

2017/0201960 A1* 7/2017 Park .................... G01S 5/02
2018/0054699 A1  2/2018 Edge et al.

OTHER PUBLICATIONS

International Search Report and Written Opinion—PCT/US2019/021279—ISA/EPO—dated May 3, 2019.
QUALCOMM Incorporated: "TP for Enhanced PRS Configuration Options," 3GPP Draft; R1-152802, 3rd Generation Partnership Project (3GPP), Mobile Competence Centre; 650, Route Des Lucioles; F-06921 Sophia-Antipolis Cedex; France, vol. RAN WG1, No. Fukuoka, Japan; May 25, 2015-May 29, 2015, May 24, 2015, XP050968854, 8 pages, Retrieved from the Internet: URL: http://www.3gpp.org/ftp/Meetings_3GPP_SYNC/RAN1/Docs/ [retrieved on May 24, 2015] pp. 1-2.

* cited by examiner

ORTHOGONALITY AND ENCAPSULATION FOR POSITIONING AND NAVIGATION SIGNALS

RELATED APPLICATIONS

This application claims the benefit of U.S. Provisional Application No. 62/655,546, filed Apr. 10, 2018, entitled "ORTHOGONALITY AND ENCAPSULATION FOR POSITIONING AND NAVIGATION SIGNALS," of which is assigned to the assignee hereof, and which is incorporated herein in its entirety by reference for all purposes.

BACKGROUND

1. Field

The subject matter disclosed herein relates to electronic devices, and more particularly to methods and apparatuses for use to support navigation and location of a mobile device using a wireless network.

2. Information

Obtaining the location or position of a mobile device that is accessing a wireless network may be useful for many applications including, for example, emergency calls, personal navigation, asset tracking, locating a friend or family member, etc. Existing position methods include methods based on measuring radio signals transmitted from a variety of devices including satellite vehicles (SVs) and terrestrial radio sources in a wireless network such as base stations and access points. In some cases, the radio signals transmitted from the radio sources are arranged for orthogonal frequency division multiplexing (OFDM) so that the radio signals can be transmitted on multiple subcarrier frequencies. In wireless networks, the mobile device may be closer to one source of radio signals than another making the closer source have a stronger signal than a more distant source. Other environmental factors can also impact the strength of the radio signals received from various sources. A stronger signal from one source may impede or drown out the weaker signal from another source. Embodiments disclosed herein address these issues by implementing techniques that allow a mobile device to receive a signal from a source without the signal being impeded or drowned out by a stronger signal from another source, allowing for more accurate positioning and location of mobile devices in wireless networks.

BRIEF DESCRIPTION OF DRAWINGS

Non-limiting and non-exhaustive aspects are described with reference to the following figures.

Figure 1:
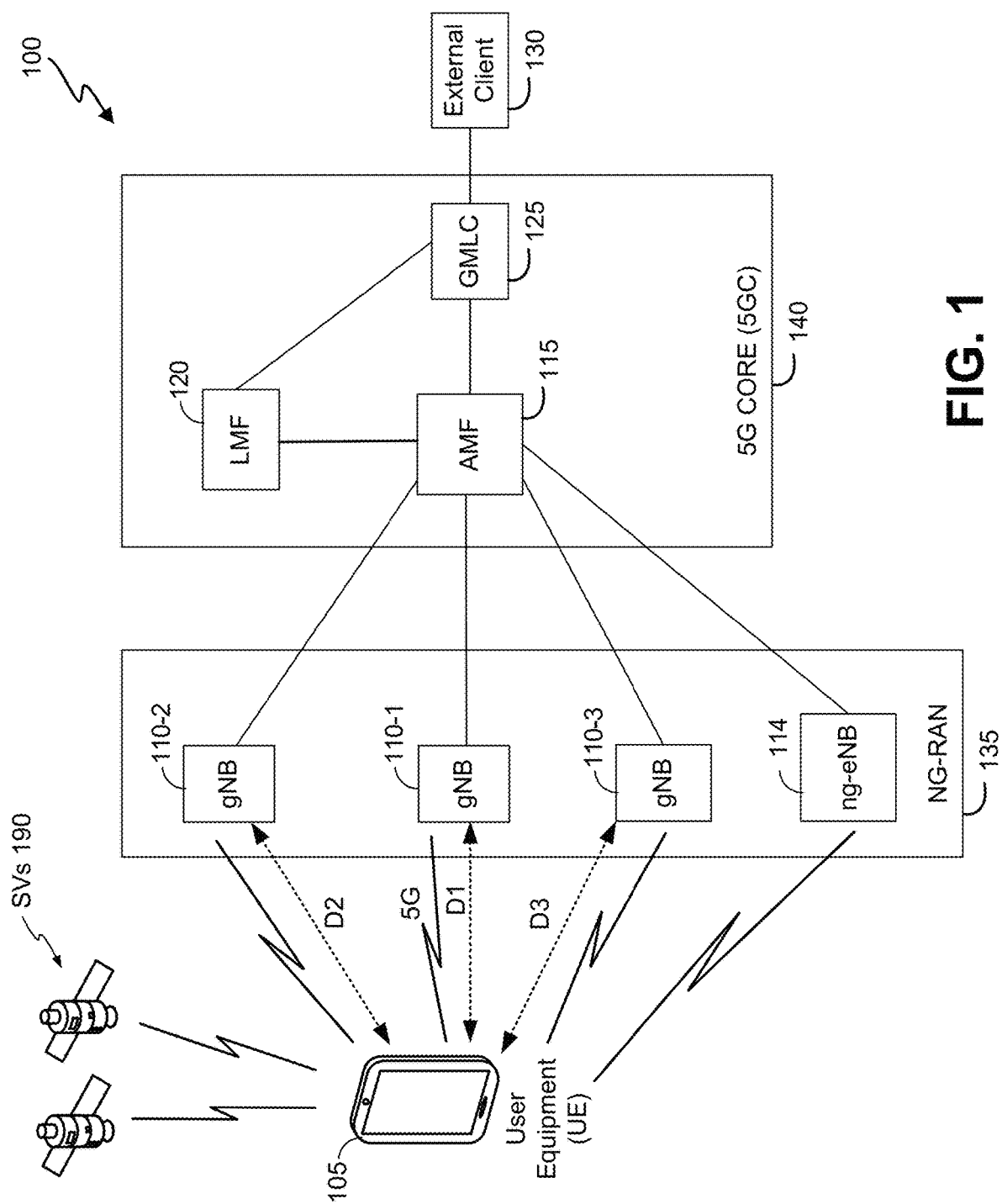
FIG. 1 illustrates a diagram of a communication system that may utilize a 5G cellular network to determine a position for a user equipment (UE), according to an embodiment.

Like reference numbers and symbols in the various figures indicate like elements, in accordance with certain example implementations. In addition, multiple instances of an element may be indicated by following a first number for the element with a hyphen and a second number. For example, multiple instances of an element 110 may be indicated as 110-1, 110-2, 110-3 etc. When referring to such an element using only the first number, any instance of the element is to be understood (e.g., elements 110 in the previous example would refer to elements 110-1, 110-2 and 110-3).

DETAILED DESCRIPTION

Some example techniques for determining the location of a user equipment (UE) are presented herein, which may be implemented at a base station, a location server (LS), the UE (e.g., a mobile device or mobile station), and/or other devices. These techniques can be utilized in a variety of applications utilizing various technologies and/or standards, including 3rd Generation Partnership Project (3GPP), Open Mobile Alliance (OMA) Long Term Evolution (LTE) Positioning Protocol (LPP) and/or LPP Extensions (LPPe), Wi-Fi®, Global Navigation Satellite System (GNSS), and the like.

Positioning methods for determining the location of a UE can be based on Observed Time Difference Of Arrival (OTDOA), pseudoranges, angle-of-arrival (AoA), angle-of-departure (AoD), received power level, and/or round-trip time (RTT) of positioning signals from radio sources (e.g., base stations). With OTDOA, a UE measures time differences, referred to as Reference Signal Time Differences (RSTDs), between reference signals transmitted by one or more pairs of base stations. The reference signals may be signals that are intended for positioning (i.e., location determination), such as the LTE Positioning Reference Signals (PRS) or may be signals intended also for serving cell timing and frequency acquisition, such as LTE Cell-specific Reference Signals (CRS) or the 5G Tracking Reference Signals (TRS). If a UE is able to measure two or more RSTDs between two or more different pairs of base stations (typically comprising a common reference base station in each pair and different neighbor base stations), the horizontal UE location can be obtained if the antenna locations and the relative timing of the base stations are known. In some cases, orthogonal frequency division multiplexing (OFDM) is used and the signals (e.g., PRS, CRS, or TRS) are arranged on subcarrier frequencies to, for example, simplify channel equalization.

Such positioning methods can be impacted by various factors (e.g., distance or environmental factors) that can influence signal strength from source base stations as received by a mobile device. For example, a mobile device may receive a strong signal from a first base station that is proximate to the mobile device and a weaker signal from a second base station that is further in distance from the mobile device. As another example, a stronger signal may be received by the mobile device from a base station that has a direct line-of-sight to the mobile station than from a base station that has a building or other object obstructing the line-of-sight between the base station and the mobile device. As yet another example, interference (e.g., electromagnetic interference) from other devices can impact the signal strength of the received signal at the mobile device. When two signals are received by the mobile device, the stronger signal can drown out the weaker signal, such that the mobile device may not detect, register, or process the weaker signal. In such cases, the position determination of the mobile device can be impacted such that the position cannot be determined or is inaccurately determined.

It is expected that fifth-generation (5G) standardization will include support for positioning methods based on OTDOA, power measurements, and RTT. The techniques, methods, and systems described herein can be applied to 5G networks (wireless or cellular) in addition to existing network infrastructures.

Embodiments described herein are directed to techniques for determining the position or location of a mobile device using OFDM and symbol hopping to mitigate the above described issues.

FIG. 1 illustrates is a diagram of a communication system 100 that may utilize a 5G network to determine a position a UE 105 using OTDOA-based positioning methods, according to an embodiment. Here, the communication system 100 comprises a UE 105 and a 5G network comprising a Next Generation (NG) Radio Access Network (RAN) (NG-RAN) 135 and a 5G Core Network (5GC) 140, which, along with providing OTDOA-based positioning, may provide data and voice communication to the UE 105. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in 3GPP. Accordingly, NG-RAN 135 and 5GC 140 may conform to current or future standards for 5G support from 3GPP. The communication system 100 may further utilize information from GNSS satellite vehicles (SVs) 190. Additional components of the communication system 100 are described below. It will be understood that a communication system 100 may include additional or alternative components.

It should be noted that FIG. 1 provides only a generalized illustration of various components, any or all of which may be utilized as appropriate, and each of which may be duplicated as necessary. Specifically, although only one UE 105 is illustrated, it will be understood that many UEs (e.g., hundreds, thousands, millions, and so forth) may utilize the communication system 100. Similarly, the communication system 100 may include a larger (or smaller) number of SVs 190, gNBs 110, ng-eNBs 114, Access and Mobility Management Functions (AMFs) 95, external clients 130, and/or other components. The illustrated connections that connect the various components in the communication system 100 comprise data and signaling connections which may include additional (intermediary) components, direct or indirect physical and/or wireless connections, and/or additional networks. Furthermore, components may be rearranged, combined, separated, substituted, and/or omitted, depending on desired functionality.

The UE 105 may comprise and/or be referred to as a device, a mobile device, a wireless device, a mobile terminal, a terminal, a mobile station (MS), a Secure User Plane Location (SUPL) Enabled Terminal (SET), or by some other name. Moreover, as noted above, UE 105 may correspond to any of a variety of devices, including a cellphone, smartphone, laptop, tablet, PDA, tracking device, navigation device, Internet of Things (IoT) device, or some other portable or moveable device. Typically, though not necessarily, the UE 105 may support wireless communication using one or more Radio Access Technologies (RATs) such as using Global System for Mobile Communications (GSM), Code Division Multiple Access (CDMA), Wideband CDMA (WCDMA), Long Term Evolution (LTE), High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and 5GC 140), and so forth. The UE 105 may also support wireless communication using a Wireless Local Area Network (WLAN) which may connect to other networks (e.g., the Internet) using a Digital Subscriber Line (DSL) or packet cable for example. The use of one or more of these RATs may enable the UE 105 to communicate with an external client 130 (e.g., via elements of 5GC 140 not shown in FIG. 1 or possibly via Gateway Mobile Location Center (GMLC) 125) and/or enable the external client 130 to receive location information regarding the UE 105 (e.g., via GMLC 125).

The UE 105 may comprise a single entity or may comprise multiple entities such as in a personal area network where a user may employ audio, video, data I/O devices and/or body sensors, and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above mean sea level, height above or depth below ground level, floor level or basement level). Alternatively, a location of the UE 105 may be expressed as a civic location (e.g., as a postal address or the designation of some point or small area in a building such as a particular room or floor). A location of the UE 105 may also be expressed as an area or volume (defined either geographically or in civic form) within which the UE 105 is expected to be located with some probability or confidence level (e.g., 67%, 95%, or the like). A location of the UE 105 may further be a relative location comprising, for example, a distance and direction or relative X, Y (and, in some embodiments, Z) coordinates defined relative to some origin at a known location which may be defined geographically, in civic terms, or by reference to a point, area, or volume indicated on a map, floor plan, or building plan. In the description contained herein, the use of the term location may comprise any of these variants unless indicated otherwise.

Base stations in the NG-RAN 135 may comprise NR Node Bs, which are more typically referred to as gNBs. In FIG. 1, three gNBs are shown—gNBs 110-1, 110-2, and 110-3, which are collectively and generically referred to herein as gNBs 110. However, a typical NG RAN 135 could comprise dozens, hundreds, or even thousands of gNBs 110. Pairs of gNBs 110 in NG-RAN 135 may be connected to one another (not shown in FIG. 1). Access to the 5G network is provided to UE 105 via wireless communication between the UE 105 and one or more of the gNBs 110, which may provide wireless communications access to the 5GC 140 on behalf of the UE 105 using 5G (also referred as NR). In FIG. 1, the serving gNB for UE 105 is assumed to be gNB 110-1, although other gNBs (e.g., gNB 110-2 and/or gNB 110-3) may act as a serving gNB if UE 105 moves to another location or may act as a secondary gNB to provide additional throughput and bandwidth to UE 105.

Base stations (BSs) in the NG-RAN 135 shown in FIG. 1 may also or instead include a next generation evolved Node B, also referred to as an ng-eNB 114. Ng-eNB 114 may be connected to one or more gNBs 110 in NG-RAN 135 (not shown in FIG. 1), for example either directly or indirectly, via other gNBs 110, and/or via other ng-eNBs. An ng-eNB 114 may provide LTE wireless access and/or evolved LTE (eLTE) wireless access to UE 105. Some gNBs 110 (e.g., gNB 110-2) and/or ng-eNB 114 in FIG. 1 may be configured to function as positioning-only beacons which may transmit signals (e.g., positioning measurements signals as described herein) and/or may broadcast assistance data to assist positioning of UE 105 but may not receive signals from UE 105 or from other UEs. It is noted that while only one ng-eNB 114 is shown in FIG. 1, the description below sometimes assumes the presence of multiple ng-eNBs 114.

As noted, while FIG. 1 depicts nodes configured to communicate according to 5G communication protocols, nodes configured to communicate according to other communication protocols, such as, for example, an LPP protocol or IEEE 802.11x protocol, may be used. For example, in an Evolved Packet System (EPS) providing LTE wireless access to UE 105, a RAN may comprise an Evolved Universal Mobile Telecommunications System (UMTS) Terrestrial Radio Access Network (E-UTRAN) which may comprise base stations comprising evolved Node Bs (eNBs) supporting LTE wireless access. A core network for EPS may comprise an Evolved Packet Core (EPC). An EPS may then comprise an E-UTRAN plus EPC, where the E-UTRAN corresponds to NG-RAN 135 and the EPC corresponds to 5GC 140 in FIG. 1. The position measurement signals described herein for support of UE 105 positioning may be applicable to such other networks.

The gNBs 110 and ng-eNB 114 can communicate with an AMF 115, which, for positioning functionality, can communicate with a Location Management Function (LMF) 120. The AMF 115 may support mobility of the UE 105, including cell change and handover, and may participate in supporting a signaling connection to the UE 105 and possibly data and voice bearers for the UE 105. The LMF 120 may support positioning of the UE 105 when UE 105 accesses the NG-RAN 135 and may support position methods such as Observed Time Difference of Arrival (OTDOA) (which can utilize the positioning measurement signals described herein) and others. The LMF 120 may also process location services requests for the UE 105 (e.g., received from the AMF 115 or from the GMLC 125). The LMF 120 may be connected to AMF 115 and/or to GMLC 125. It is noted that in some embodiments, at least part of the positioning functionality, including derivation of a UE 105 location, may be performed at the UE 105 (e.g., using signal measurements obtained by UE 105 for position measurement signals transmitted by wireless nodes such as gNBs 110 and ng-eNB 114 and assistance data provided to the UE 105, for example, by LMF 120).

The Gateway Mobile Location Center (GMLC) 125 may support a location request for the UE 105 received from an external client 130. GMLC 125 may forward such a location request to the AMF 115 for forwarding by the AMF 115 to the LMF 120. In an embodiment, GMLC 125 may forward the location request directly to the LMF 120. A location response from the LMF 120 (e.g., containing a location estimate for the UE 105) may be similarly returned to the GMLC 125 either directly or via the AMF 115, and the GMLC 125 may then return the location response (e.g., containing the location estimate) to the external client 130. The GMLC 125 is shown connected to both the AMF 115 and LMF 120 in FIG. 1 though only one of these connections may be supported by 5GC 140 in some implementations.

As noted, while the communication system 100 is described in relation to 5G technology, the communication system 100 may be implemented to support other communication technologies, such as GSM, WCDMA, LTE, and the like, that are used for supporting and interacting with mobile devices such as the UE 105 (e.g., to implement voice, data, positioning, and other functionalities). In some such embodiments, the 5GC 140 may be configured to control different air interfaces. For example, in some embodiments, 5GC 140 may be connected to a WLAN using a Non-3GPP InterWorking Function (N3IWF, not shown FIG. 1) in the 5GC 140. For example, the WLAN may support IEEE 802.11 WiFi access for UE 105 and may comprise one or more WiFi APs. Here, the N3IWF may connect to the WLAN and to other elements in the 5GC 140, such as AMF 115. In some other embodiments, both the NG-RAN 135 and the 5GC 140 may be replaced by other RANs and other core networks. For example, in an EPS, the NG-RAN 135 may be replaced by an E-UTRAN containing eNBs, and the 5GC 140 may be replaced by an EPC containing a Mobility Management Entity (MME) in place of the AMF 115, an Evolved Serving Mobile Location Center (E-SMLC) in place of the LMF 120, and a GMLC that may be similar to the GMLC 125. In such an EPS, the E-SMLC may send and receive location information to and from the eNBs in the E-UTRAN and may support positioning of UE 105. In these other embodiments, positioning of a UE 105 may be supported in an analogous manner to that described herein for a 5G network with the difference that functions and procedures described herein for gNBs 110, ng-eNB 114, AMF 115 and LMF 120 may, in some cases, apply instead to other network elements such eNBs, WiFi APs, an MME, and an E-SMLC.

Position determination of the UE 105 by the communication system 100 typically involves determining a distance between the UE 105 and each of a plurality of base stations 110, 114 (e.g., distances D1, D2, and D3 between the UE 105 and GNBs 110-1, 110-2, and 110-3, respectively) and using trilateration to determine the UE location. As noted above, to determine these distances, the UE 105 can measure position measurement signals (including the reference signals discussed herein below) transmitted by these base stations 110, 114. Position determination using OTDOA based on RSTD measurements, for example, typically requires either synchronization of the transmission of these reference signals by the base stations 110, 114 or knowledge obtained in some other way of the RTTs between pairs of base stations 110, 114. The LMF 120 typically has this knowledge, and thus, position determination in asynchronous networks based on measurements obtained (e.g., taken) by the UE 105 of the various base stations 110, 114 can involve, for example, the LMF 120 determining the position of the UE 105 after receiving the measurements from the UE 105, or the UE 105 determining its own position after receiving RTT information from the LMF 120. In LTE networks, positioning reference signals (PRSs) are typically used to make these RSTD measurements for OTDOA positioning.

Figure 2:
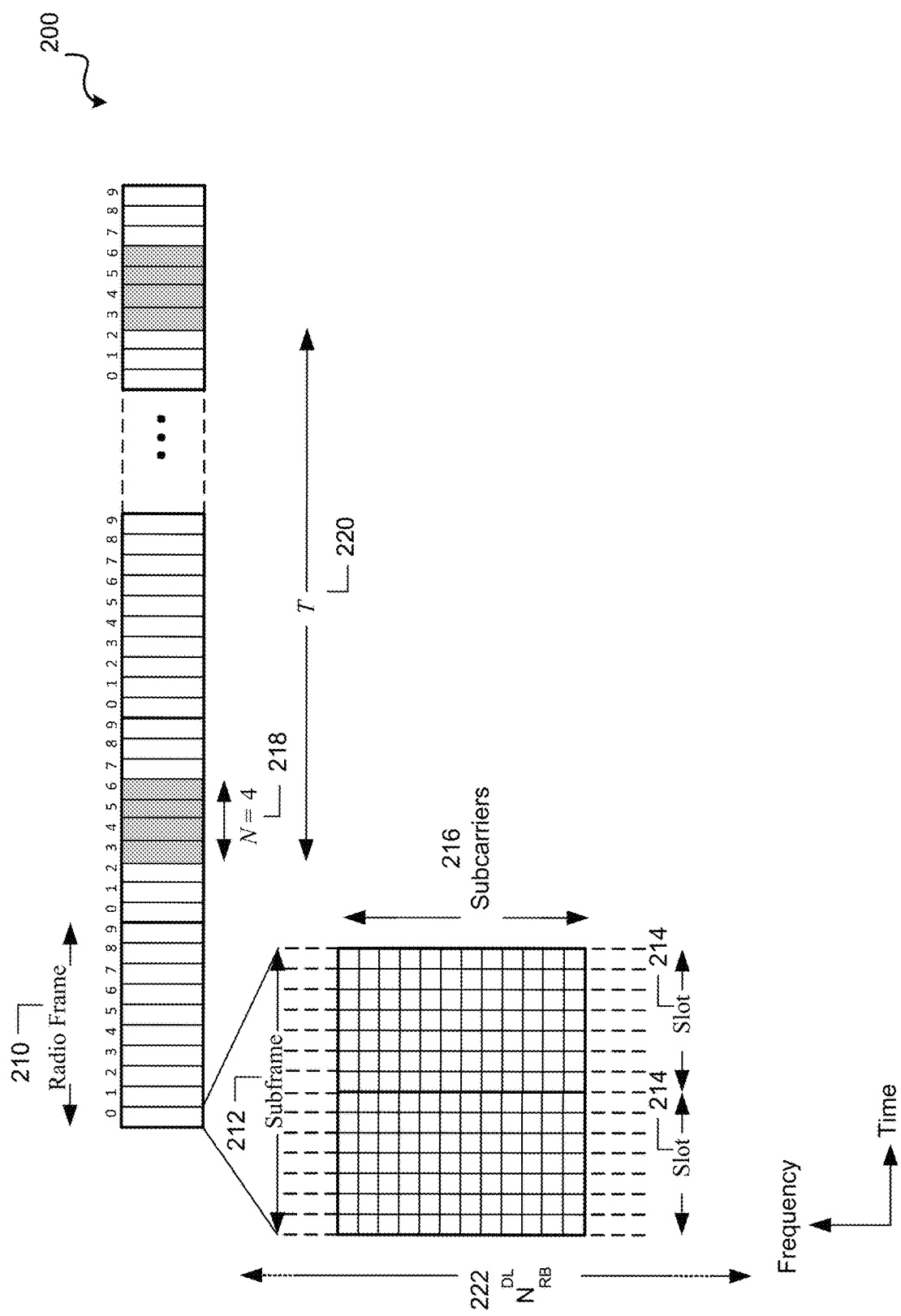
FIG. 2 illustrates high level structure of an OFDM signal.

FIG. 2 illustrates high-level signal structure of an OFDM signal showing a multitude of symbols that define a slot, one (1) or more slots that define a sub-frame, and a multitude of sub-frames that define a radio frame. As an example, the description below will use the example of and LTE sub-frame sequence with PRS positioning occasions, provided for reference. In FIG. 2, time is represented horizontally (e.g., on an X-axis) with time increasing from left to right, while frequency is represented vertically (e.g., on a Y-axis) with frequency increasing (or decreasing) from bottom to top, as illustrated. As shown in FIG. 2, downlink and uplink Radio Frames 210 are depicted. As an example, in LTE networks, the downlink and uplink radio frames 210 are of 10 ms duration each. Continuing the LTE example, for downlink Frequency Division Duplex (FDD) mode, Radio Frames 210 are organized into ten sub-frames 212 of 1 ms duration each. Each sub-frame 212 comprises two slots 214, each of 0.5 ms duration. In LTE, these radio frames 210 are transmitted by base stations similar to base stations 110, 114 of FIG. 1. PRS may be detected by any UE in the area and are therefore considered to be "broadcast" by these base stations. Any receiving device (e.g., a UE that receives the broadcast signal) can use the PRS for positioning.

In the frequency domain, the available bandwidth may be divided into uniformly spaced orthogonal subcarriers 216. For example, for a normal length cyclic prefix using 15 kHz spacing, subcarriers 216 may be grouped into a group of 12 subcarriers or "frequency bins." Each subcarrier may be considered a subcarrier frequency band of a predefined frequency band. Each grouping, which comprises 12 subcarriers 216 is termed a "resource block" (or "physical resource block" (PRB)) and, in the example, the number of subcarriers in the resource block may be written as $N_{SC}^{RB}=12$. For a given channel bandwidth, the number of available resource blocks on each channel 222, which is also called the transmission bandwidth configuration 222, is indicated as $N_{RB}^{DL}$ 222. For example, for a 3 MHz channel bandwidth in the above example, the number of available resource blocks on each channel 222 is given by $N_{RB}^{DL}=15$.

Resource blocks therefore can be described as a unit of frequency and time resources. In the LTE example, the resource block comprises one sub-frame 212 (two slots 214) of radio frame 210 and 12 subcarriers. Each slot 214 comprises 6 (or in some cases 7 in LTE networks) periods, or "symbols," during which a base station (for downlink (DL) radio frames) or UE (for uplink (UL) radio frames) may transmit RF signals. Each 1 subcarrier×1 symbol cell in the 12×12 or 14×12 grid represents a "resource element" (RE), which is the smallest discrete part of the frame and contains a single complex value representing data from a physical channel or signal.

A signal, like PRS, may be transmitted in special positioning sub-frames that are grouped into positioning "occasions." For example, in LTE, a PRS occasion can comprise a number N of consecutive positioning sub-frames 218 where the number N may be between 1 and 160 (e.g., may include the values 1, 2, 4 and 6 as well as other values). The PRS occasions for a cell supported by a base station may occur periodically at intervals 220, denoted by a number T, of millisecond (or sub-frame) intervals where T may equal 5, 10, 20, 40, 80, 160, 320, 640, or 1280. As an example, FIG. 2 illustrates a periodicity of PRS occasions where N equals 4 and T is greater than or equal to 20. In some embodiments, T may be measured in terms of the number of sub-frames between the start of consecutive PRS occasions.

PRS can be deployed with a pre-defined bandwidth, which may be provided, from a location server via a serving base station, to a UE along with other PRS configuration parameters (e.g., N, T, any muting and/or frequency hopping sequences, PRS ID) and position determination information. Generally speaking, the higher the allocated bandwidth for PRS, the more accurate the position determination, so there is a tradeoff between performance and overhead.

For the 5G standard, it is anticipated that radio frames will be similar to the structure for LTE illustrated in FIG. 2, however, certain characteristics (e.g., timing, available bandwidth, and so forth) may vary. Additionally, the characteristics of a new position measurement signal to replace PRS may vary as well to enable this new reference signal to provide accurate measurements, be robust to multipath, provide a high level of orthogonality and isolation among cells, and consume relatively low UE power, above and beyond the current characteristics of PRS.

Figure 3:
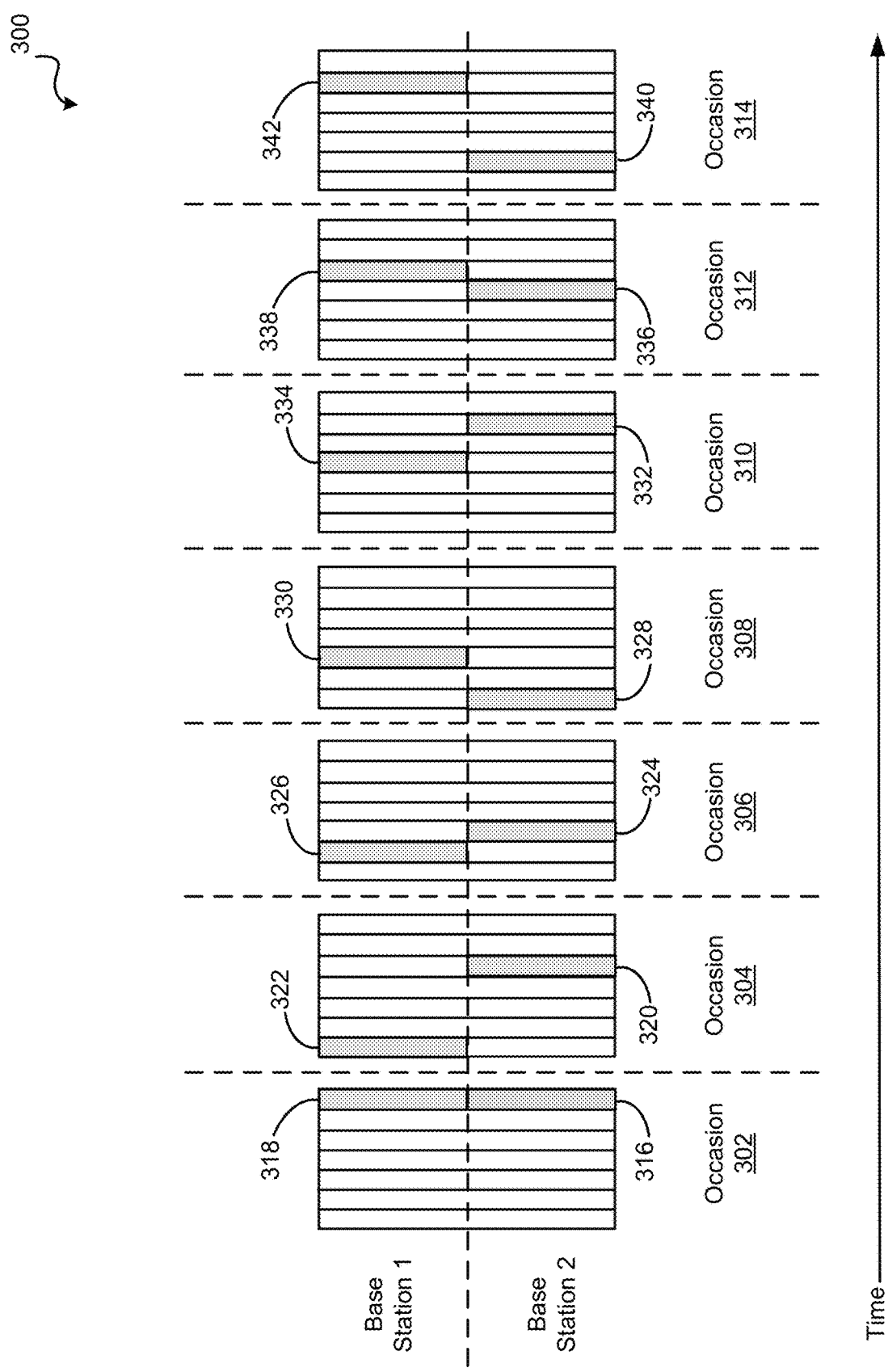
FIG. 3 illustrates a visual depiction of symbol hopping for two radio signal sources over multiple occasions, according to an embodiment.

FIG. 3 illustrates a visual depiction 300 of an example of symbol hopping for two radio signal sources (e.g., base stations) over multiple occasions. Such symbol hopping can reduce collisions or interference of signals from multiple base stations at a receiving mobile device. Depicted in FIG. 3 are a series of occasions 302, 304, 306, 308, 310, 312, and 314 that happen over time, where time increases from left to right in visual depiction 300. The blocks depicted in each occasion 302, 304, 306, 308, 310, 312, and 314 can be viewed as a single subcarrier frequency for a slot in the occasion with each slot having seven (7) symbols in this example. In 5G, other numbers of symbols per slot may be used such as twelve (12) or fourteen (14). The slot depicted in each occasion can be repeated multiple times during the occasion and other slots may exist between successive occasions as represented by the vertical dashed lines. The upper portion (above the dashed horizontal line) of each depicted block in each occasion 302, 304, 306, 308, 310, 312, and 314 indicates a highlighted symbol (318, 322, 326, 330, 334, 338, 342) during which base station 1 transmits a wireless position signal. The lower portion (below the dashed horizontal line) of each depicted block in each occasion 302, 304, 306, 308, 310, 312, and 314 indicates a highlighted symbol (316, 320, 324, 328, 332, 336, 340) during which base station 2 transmits a wireless position signal.

The visual depiction 300 includes seven (7) occasions 302, 304, 306, 308, 310, 312, and 314. In any given network configuration, more or fewer occasions can exist. The highlighted symbols represent the designated symbols for base station 1 and base station 2 for each occasion. During the designated symbols, the base stations can transmit signals. Base station 1 and base station 2 can be any suitable radio signal sources. Base station 1 and base station 2 can be neighboring base stations. Neighboring base stations can be base stations that are sufficiently close in proximity that signals transmitted by either base station can be received by a single mobile device.

A cell is a geographical area defined within the cellular network, and each cell is served by one or more fixed-location transceivers (e.g., base stations). While a cell can be served by more than one base station, for ease of explanation, the term cell and base station may be used interchangeably herein. Each transmit occasion for a cell can begin at a certain point in time. For example, occasion 302 can begin at an anchor point in time. The anchor point in time for a base station can be associated with a common time frame shared with other base stations in the network. This common time frame can for example be based on the System Frame Number (SFN), or in another example, be based on Global Positioning System (GPS) time. The anchor occasion for a base station can also be associated with the start of a sequence of symbol allocations for further occasions. In this way, a mobile device that has knowledge of the common time frame, knowledge of the anchor point(s) for one or more cells, and knowledge of the sequence(s) of symbol allocations for one or more cells, can measure the signals in any occasion and associate the measurement with the appropriate cell.

Referring back to FIG. 2, as previously described, a resource block in an LTE example comprises one sub-frame 212 (i.e., two slots 214) and 12 subcarriers. Each slot 214 comprises 6 or 7 (in LTE networks) periods, or "symbols," during which a base station may transmit RF signals. Each occasion 302, 304, 306, 308, 310, 312, and 314 can therefore be envisioned as a single subcarrier (shown in FIG. 2 on the Y-axis) and one slot 214 (shown in FIG. 2 on the X-axis). As previously discussed, a slot may be repeated multiple times in a given occasion. So, for example, while occasion 302 depicts a single slot having seven (7) symbols, the depicted slot may be repeated during occasion 302 as many or as few times as is appropriate for the network configuration. While FIG. 2 describes an LTE example, it is anticipated that position measurement signals will be transmitted during occasions in a similar manner in 5G networks. The symbol hopping described herein can be used in any network that transmits position measurement signals during designated symbols.

A symbol can be described as a specific period of time during which any given base station may transmit a signal, which may be received, for example, by a UE (e.g., UE 105). Using the example of 7 symbols (such as in LTE networks), there are 7 symbols in each occasion 302, 304, 306, 308, 310, 312, and 314. Because, in the LTE example, a slot is 0.5 ms, each symbol is 0.07 ms (i.e., 0.5 divided by 7). The slot can be thought of as a successive series of seven (7) symbols in order starting at time zero, with a new symbol beginning each 0.07 ms. Each symbol has a unique position within the slot. For this example of 7 symbols, the symbols for an occasion can be envisioned as "symbol 1," "symbol 2," "symbol 3," "symbol 4," "symbol 5," "symbol 6," and "symbol 7" with symbol 1 being the first transmitted symbol and each of the symbols being in order thereafter through symbol 7. The specific time values used herein are not intended to be limiting and instead are for example and explanatory purposes. A slot can be any unit of time, and a slot can contain any number of symbols.

Returning to FIG. 3, in the first occasion 302, the base station 1 transmits signal 318, and base station 2 transmits signal 316. Each of signal 318 and signal 316 are transmitted in the frequency domain at the same subcarrier frequency. Further, each of signal 318 and signal 316 are transmitted in the time domain during symbol 7. Accordingly, a receiving UE (e.g., UE 105) can receive both signals 316 and 318 at the same subcarrier frequency and at the same time (during the same symbol), making the signals difficult, if not impossible, to properly process individually. The signals 316 and 318, received by the mobile device at the same time on the same subcarrier frequency can collide or interfere with each other such that, for example, the stronger signal (e.g., signal 318) can drown out the weaker signal (e.g., 316). If signal 318 is stronger and drowns out signal 316, the mobile device may not be able to correctly determine a position because it would not have the position measurement signal information in signal 316 to utilize to determine its position.

Positioning measurement signals (e.g., PRS) may be transmitted repeatedly over multiple occasions, such that the slot depicted in occasion 302 would be repeated, for example, six (6) times. In such a configuration, the signal 316 and the signal 318 would each interfere with the other for the entire occasion 302. Further, in previous network configurations and in configurations that do not implement symbol hopping, a base station may transmit on the same subcarrier frequency at the same symbol in each successive occasion. For example, both base station 1 and base station 2, in such configurations, would transmit on the same subcarrier frequency at symbol 7 for each occasion. By always transmitting on the same subcarrier frequency at the same symbol, signals transmitted from two transmitting base stations that transmit at the same symbol and subcarrier frequency would always interfere or collide, potentially making any UE receiving the signals (e.g., signals 316 and 318) unable to accurately use the positioning measurement signals from one or both of the sources (e.g., base station 1 and base station 2). In some cases, the base station 1 signal 318 can be stronger as received by a UE than the base station 2 signal 316. In such cases, the base station 1 signal 318 can drown out the base station 2 signal 316 as received by the UE. Accordingly, the UE may not process or register base station 2 signal 316 and therefore not use base station 2 signal 316 for determining the UE position, which can make the position determination less accurate or, in some cases, not possible for lack of sufficient information.

The visual depiction 300 represents symbol hopping. When utilizing symbol hopping, for each occasion, a base station will "hop" to a different symbol within the slot. Each base station can follow a different pattern for hopping to minimize the possibility that two base stations will always interfere or collide with each other. Accordingly, the occasions 302, 304, 306, 308, 310, 312, and 314 are not each a replica of the previous occasion. Occasions 302, 304, 306, 308, 310, 312, and 314 can be envisioned as consecutive occasions for transmitting positioning measurement signals from base station 1 and base station 2 using symbol hopping.

As depicted in the second occasion 304, base station 1 transmits signal 322, and base station 2 transmits signal 320. In the second occasion 304, each of signal 320 and signal 322 are transmitted in the frequency domain at the same subcarrier frequency. However, in the second occasion 304, signal 320 is transmitted in the time domain during symbol 5, and signal 322 is transmitted in the time domain during symbol 1. As such, signal 320 transmitted by base station 2 and signal 322 transmitted by base station 1 do not interfere with each other in the time domain, making any receiving UE more likely to be able to utilize the signals 322 and 320 for position determination.

As depicted in the third occasion 306, the base station 1 transmits signal 326, and base station 2 transmits signal 324. In the third occasion 306, each of signal 326 and signal 324 are transmitted in the frequency domain at the same subcarrier frequency and in the time domain during differing symbols. Signal 326 is transmitted during symbol 2, and signal 324 is transmitted in the time domain during symbol 3.

The symbol hopping is facilitated using a pattern formula. The pattern formula for each base station can be, for example, unique across the network or unique in a given area. The pattern formula can indicate, for example, a beginning symbol and a pattern to follow for each subsequent symbol. For example, base station 1 may be using a formula that starts with symbol 7 and advances one (1) symbol at each occasion such that the pattern formula equals seven plus the occasion number (7+ occasion number). Accordingly, on occasion 302, base station 1 transmits signal 318 during symbol 7; at occasion 304, base station 1 transmits signal 322 during symbol 1 (since there is no symbol 8, the pattern returns to symbol 1); at occasion 306, base station 1 transmits signal 326 during symbol 2; at occasion 308, base station 1 transmits signal 330 during symbol 3; and so forth. Similarly, base station 2 may be using a formula that starts with symbol 7 and advances five (5) symbols at each occasion. Accordingly, on occasion 302, base station 2 transmits signal 316 during symbol 7; at occasion 304, base station 2 transmits signal 320 during symbol 5; at occasion 306, base station 2 transmits signal 324 during symbol 3; at occasion 308, base station 2 transmits signal 328 during symbol 1; and so forth.

The pattern formula for each radio signal source (e.g., base station 1 and base station 2) can be obtained, for example, from a location server, such as, for example LMF 120 as described with respect to FIG. 1. The pattern formula for each radio signal source can be, for example, an equation that the radio signal source solves to determine which symbol to transmit during (i.e., the outcome from solving the equation identifies the symbol). Further, the pattern formula for each radio signal source can be unique (or at least unique within a geographic region) by using, for example, the physical cell identifier (PCI) of the radio signal source (e.g., base station) or the global cell identifier (GCI) of the radio signal source. As previously discussed, the pattern formula can depend on the occasion number (e.g., each subsequent occasion hop forward 5 symbols).

As shown in FIG. 3, base station 1 signal 318 and base station 2 signal 316 at occasion 302 collide or interfere with the other during symbol 7. Further, during each of occasions 304, 306, 308, 310, 312, and 314 signals transmitted by base station 1 do not collide with signals transmitted by base station 2 because the pattern results in each base station hopping symbols that do not collide. At occasion 302, for example base station 1 signal 318 may be a stronger signal as received by a UE than base station 2 signal 316. In such cases, base station 1 signal 318 can drown out base station 2 signal 316 such that the UE may not clearly receive base station 2 signal 316. However, at occasions 304, 306, 308, 310, 312, and 314, the UE can receive each signal from base station 1 and each signal from base station 2 without the signals from base station 1 drowning out the signals from base station 2 because the base stations transmit at different symbols for each of those occasions.

Figure 4:
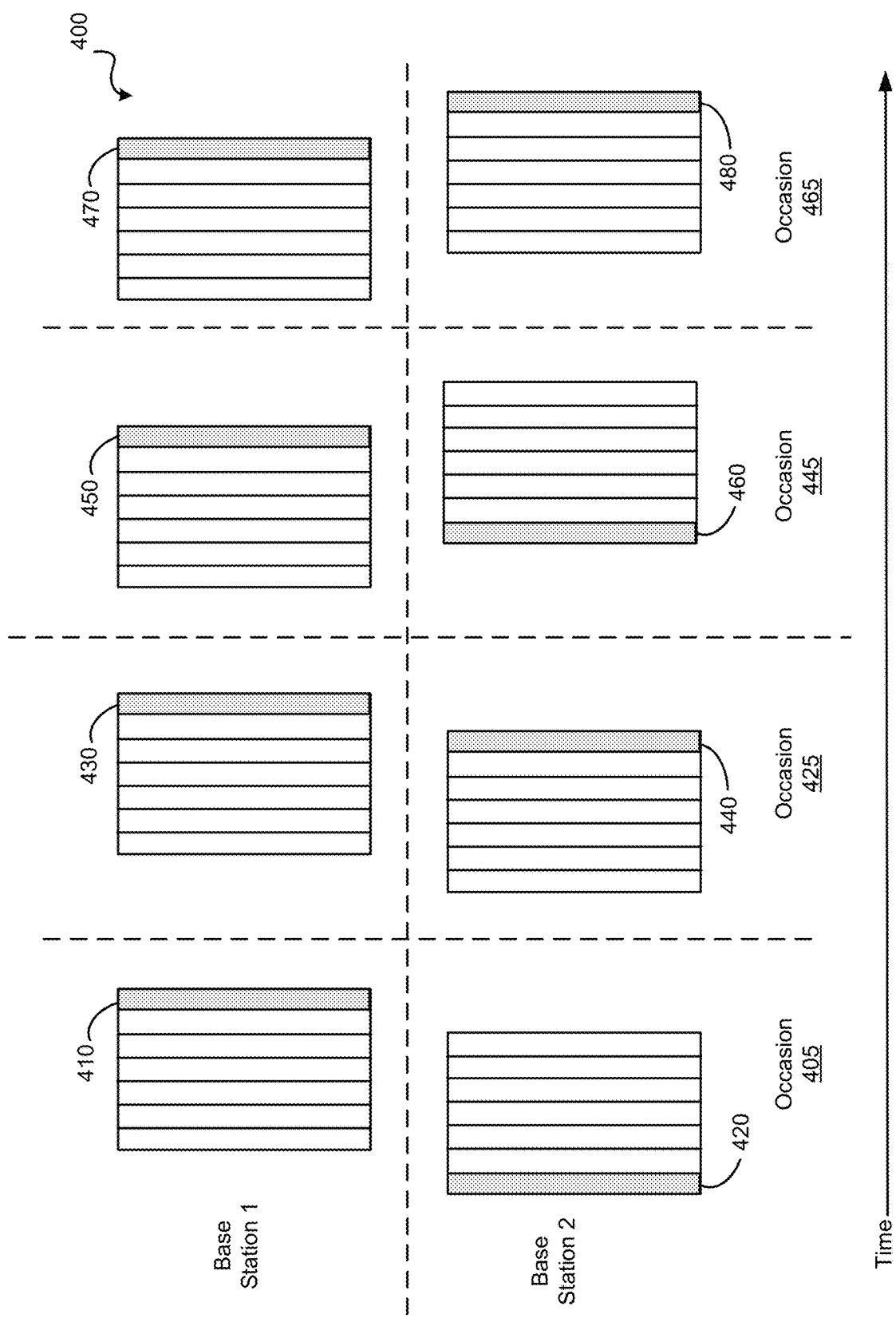
FIG. 4 illustrates a visual depiction of symbol hopping overlap for two radio signal sources when slot boundaries are not aligned, according to an embodiment.

FIG. 4 illustrates a visual depiction 400 of symbol hopping overlap for radio signal sources when slot boundaries are not aligned in the time domain. Slot boundaries as described in the time domain are temporal boundaries. The slot boundaries for a slot are the time at which a specified slot is to begin and the time at which the specified slot is to end. Each device within a network may be synchronized in the time domain such that a clock in each base station (and possible in the UE) will be synchronized. The devices within the network are further configured to transmit in a synchronized manner such that any given slot begins at the same time for each device based upon the synchronized clocks. The visual depiction 400 is similar to visual depiction 300 of FIG. 3, but includes fewer occasions. In visual depiction 400, the slot boundaries for base station 1 and base station 2 are not aligned, whereas in visual depiction 300 of FIG. 3, the slot boundaries for base stations 1 and 2 are aligned.

As discussed above with respect to FIG. 3, base station 1 and base station 2 can utilize a common timeframe to anchor the begin time for each occasion, such as occasion 405. As shown in FIG. 4, despite the common timeframe, reception of the symbols from the base stations at a mobile device may not be aligned precisely with the common timeframe. This misalignment causes the slot boundaries to appear misaligned to the receiving mobile device.

As seen in FIG. 4 for occasion 405, the slot boundaries in the time domain (with time shown increasing from left to right) for base station 2 are earlier than the slot boundaries for base station 1. This misalignment of slot boundaries can impact reception of signals within an occasion at the UE. Slot boundaries may not be aligned when radio signal sources are not synchronized precisely or drift has caused a radio signal source to become out of alignment with other radio signal sources. Additionally, from the perspective of the receiving UE, the slot boundaries may not appear to be aligned because the UE may receive the signal from a first base station (e.g., base station 1) earlier than the UE receives the signal from a second base station (e.g., base station 2). The signals may be received at differing times due to differences in distances between the UE and the base stations or interference (e.g., environmental factors) that impede the speed at which the UE receives the signal from the base station.

A receiving UE is typically aligned with a primary base station such that the UE listens for symbols of a slot within the slot boundaries of the primary base station. For example, base station 1 can be the primary base station for the UE. The slot alignment (slot boundary) of base station 1 can be the alignment (boundary) the UE relies upon for receiving symbols from other base stations (e.g., neighbor base stations to base station 1). Accordingly, if the neighbor base station (e.g., base station 2) is not in alignment with the primary base station (e.g., base station 1), such that the slot boundary for base station 1 does not match the slot boundary for base station 2, the symbols from base station 2 may not be received (or processed or recognized) by the UE. The slot boundary is a temporal boundary (i.e., a boundary in time) such that a specified time marks the beginning of the slot boundary. Therefore, as an example, if the symbol from base station 2 arrives prior to the slot boundary, the UE may not recognize the symbol as such as described in more detail below.

Turning again to FIG. 4, at a first occasion 405, base station 1 transmits signal 410 at symbol 7. The slot boundaries of base station 2 do not match (are misaligned from) the slot boundaries of base station 1 during the first occasion 405. The slot boundaries for base station 2 precede (are earlier in time than) the slot boundaries for base station 1 (i.e., the slot boundary for base station 1 trails (follows in time) the slot boundary for base station 2). In this example, base station 1 can be the primary base station to which a UE is aligned. At the first occasion 405, base station 2 transmits signal 420 during symbol 1 in accordance with the slot boundaries of base station 2. Because the UE is aligned with base station 1, the UE will not receive or recognize signal 420 as part of the first occasion 405 because signal 420 may be received prior to the UE listening for symbols associated with occasion 405 based on the slot boundaries for base station 1. In time division duplexing (TDD) deployments, for example, it is possible that the preceding slot is used for uplink and reception will not be feasible.

Looking now at the second occasion 425, base station 1 transmits signal 430 during symbol 7. The slot boundaries of base station 2 precede (are earlier in time than) the slot boundaries of base station 1 during the second occasion 425. At the second occasion 425, base station 2 transmits signal 440 during symbol 7, which falls within the slot boundaries of base station 1. For that reason, the UE, aligned with base station 1, can receive signal 440 from base station 2.

As shown in occasions 405 and 425, base station 2 can use a pattern formula to symbol hop such that base station 2 transmits its positioning measurement signal within the slot boundaries of the primary base station 1 during at least some occasions (e.g., occasion 425). Accordingly, the UE will at least sometimes receive the positioning measurement signal for the neighbor stations that have slot boundaries that are not aligned with the slot boundaries of the primary base station when the neighboring base station slot boundaries are leading (earlier in time) the slot boundaries of the primary base station.

At the third occasion 445, the slot boundaries of base station 1 precede the slot boundaries of base station 2. For example, the mobile device can travel closer in distance to base station 1, making the slot boundaries for base station 1 appear to the UE to precede the slot boundaries for base station 2. However, visual depiction 400 is exemplary, and the alignment of slot boundaries for base stations need not be misaligned, change alignment, or remain constant with respect to any misalignment over time. For example, the slot boundaries for base station 1 may precede the slot boundaries for base station 2 at every occasion, the slot boundaries for base station 1 may trail the slot boundaries for base station 2 at every occasion, the slot boundaries for base station 1 may be aligned with the slot boundaries for base station 2 at every occasion, or the alignment or misalignment of the slot boundaries for base station 1 and base station 2 may change between some or all occasions. As shown, at occasion 445, base station 1 transmits signal 450 during symbol 7 according to the base station 1 slot boundaries. Base station 2 transmits signal 460 during symbol 1, which falls within the slot boundaries of base station 1 for occasion 445. For that reason, the UE, aligned with base station 1, can receive signal 460 from base station 2 during occasion 445.

Looking now at the fourth occasion 465, base station 1 transmits signal 470 during symbol 7. The slot boundaries of base station 2 trail (are later in time than) the slot boundaries of base station 1 during the fourth occasion 465. At the fourth occasion 465, base station 2 transmits signal 480 during symbol 7 according to the slot boundaries of base station 2. Because the UE is aligned with base station 1, the UE may not receive signal 480 as part of the fourth occasion 465 because the UE will not be listening for signals of occasion 465 outside the slot boundaries of base station 1. Since signal 480 is transmitted outside (after) the slot boundaries of base station 1 for occasion 465, the UE may not receive (or process or recognize) signal 480.

As shown in occasions 445 and 465, base station 2 can use a pattern formula to symbol hop such that base station 2 transmits its positioning measurement signal within the slot boundaries of the primary base station 1 during at least some occasions (e.g., occasion 445). Accordingly, the UE will at least sometimes receive the positioning measurement signal for the neighbor stations that have slot boundaries that are not aligned with the slot boundaries of the primary base station when the neighboring base station slot boundaries are trailing (later in time) the slot boundaries of the primary base station. Symbol hopping as described herein can, therefore, allow a UE to receive signals transmitted by a neighbor base station that has slot boundaries that are not aligned (either because the neighbor base station slot boundaries lead or lag behind) with the primary base station slot boundaries.

Figure 5:
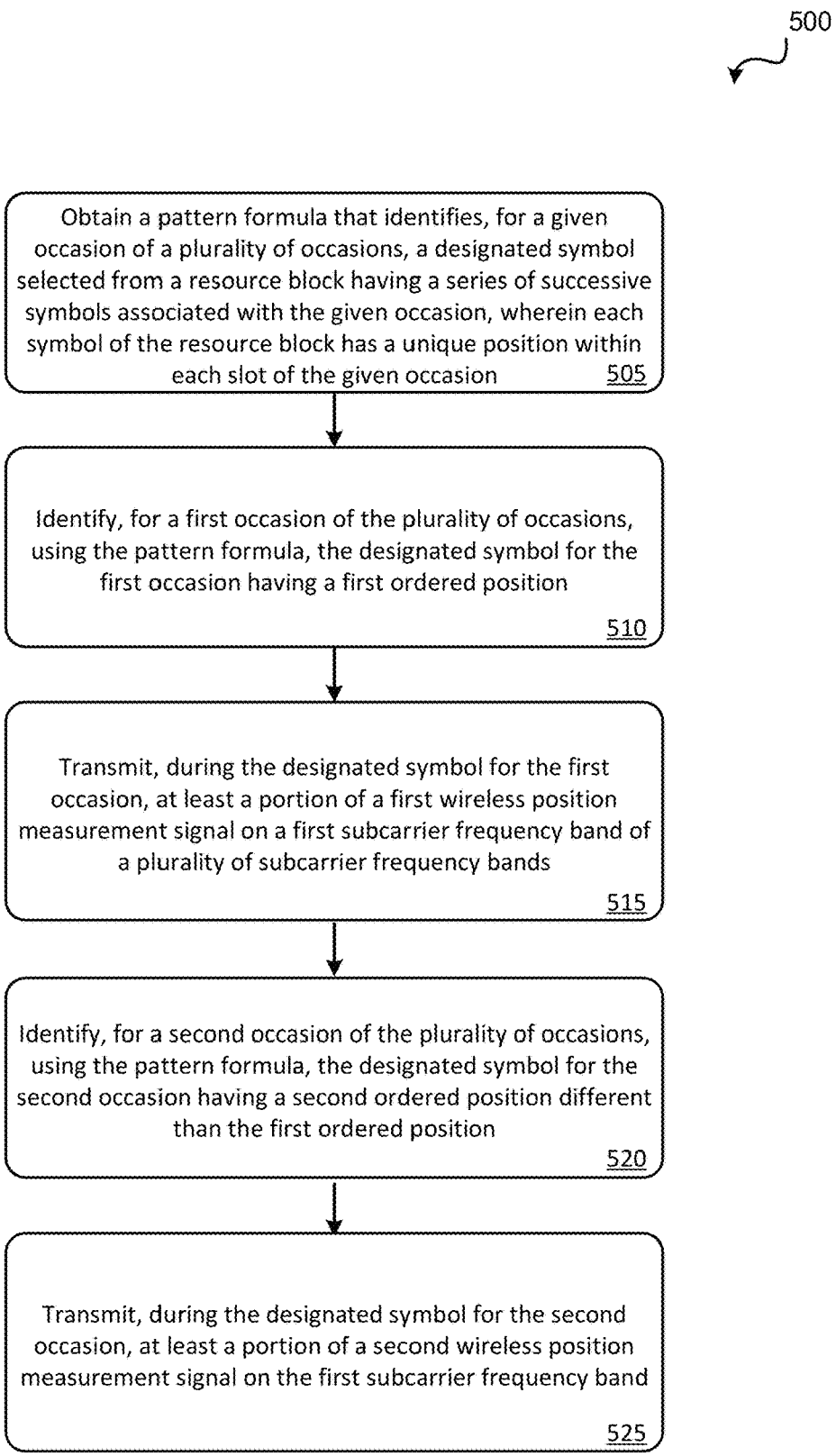
FIG. 5 illustrates a flow diagram of a method for providing a source radio signal using symbol hopping, according to an embodiment.

FIG. 5 illustrates a flow diagram of a method 500 for providing a source radio signal using symbol hopping. The method 500 can be performed by, for example, a base station in a network such as any of gNBs 110 or ng-eNB 114 as described with respect to FIG. 1.

Method 500 can begin at block 505 with, for example, a base station obtaining a pattern formula that identifies, for a given occasion of a plurality of occasions, a designated symbol selected from a resource block having a series of successive symbols associated with the given occasion, wherein each symbol of the resource block has a unique position within each slot of the given occasion. As previously described, a resource block can include multiple symbols, each of which is a duration of time, and each of which is successive and ordered within a given slot. For example, a resource block having a 0.5 ms slot and 7 symbols will have symbol 1 starting at the beginning of the 0.5 ms slot and lasting for 0.07 ms. Immediately after symbol 1 ends, symbol 2 begins and lasts for 0.07 ms. Immediately after symbol 2 ends, symbol 3 begins and lasts for 0.07 ms. The symbols will continue, the next symbol immediately following the previous symbol, until all 7 symbols are complete. As also described, a base station (or any radio signal source) can be assigned a symbol and subcarrier frequency for transmitting a signal. The assigned symbol can be determined from a pattern formula. The pattern formula can be received from, for example, a location server or other controller or computing device for the network (e.g., 5G network). The pattern formula can identify, for the base station, during which symbol to transmit. For example, the pattern formula can identify a symbol during which to transmit during each slot of the first occasion and a pattern to follow for each subsequent occasion such that following the pattern formula results in identification of, for any given occasion, the symbol during which to transmit for each slot of the occasion (e.g., the base station transmits at symbol 2 during each slot of the occasion and transmits at symbol 4 during each slot of the next occasion, based on a formula pattern). As an example, as described with respect to FIG. 3, base station 1 can have a pattern formula that begins at symbol 7 for the first occasion and advances one (1) symbol at each subsequent occasion. The first symbol in the occasion may be associated with an instance in a common timeframe. The common timeframe can be used by all devices in a cell (e.g., base station, user devices, and so forth) such that each device is aligned. The common timeframe can be, for example, aligned with the System Frame Number (SFN) of the network. In some embodiments, the common timeframe can be based on a different common time scale such as GPS time.

Means for performing the functionality at block 505 may comprise one or more components of a computer system, such as a bus 905, processing unit(s) 910, working memory 935, operating system 940, application(s) 945, and/or other components of the computer system 900 illustrated in FIG. 9 and described in more detail below.

At block 510, the base station can determine, for a first occasion of the plurality of occasions, using the pattern formula, the designated symbol for the first occasion having a first ordered position. For example, the pattern formula can identify a symbol for each slot of the first occasion using the PCI or GCI for the base station. As another example, the pattern formula can provide an equation to be solved for each occasion to identify the designated symbol for each slot of the occasion. In an embodiment, the equation can include the occasion number. As a visual depiction, symbol 7 can be the designated symbol for base station 1 at occasion 302 as described with respect to FIG. 3. The first ordered position for the example depicted in FIG. 3 is symbol 7.

Means for performing the functionality at block 510 may comprise one or more components of a computer system, such as a bus 905, processing unit(s) 910, working memory 935, operating system 940, application(s) 945, and/or other components of the computer system 900 illustrated in FIG. 9 and described in more detail below.

At block 515, the base station can transmit, during the designated symbol for the first occasion, at least a portion of a first wireless position measurement signal to a mobile device. Stated differently, once the base station has determined the designated symbol for the given occasion, during each slot of the occasion, the base station can transmit a signal during the designated symbol. For example as a visual depiction, base station 1 can transmit signal 318 during symbol 7 at each slot of occasion 302 as described with respect to FIG. 3. The signal can be a positioning measurement signal or a portion of a positioning measurement signal. The base station can know when a given occasion for transmitting the position measurement signal begins based on synchronization with a location server or other controller of the network or based on GPS synchronization. Such a location server can provide information regarding the network and location services within the network to base stations within a geographic region and/or user equipment within the geographic region. Further, as previously mentioned, base stations may transmit position measurement signals for any UE within range to receive. Stated differently, the base station can broadcast the position measurement signal to any and/or all UEs that are listening for signals transmitted during the given occasion. Because position measurement signals may be transmitted over more than one symbol as defined by the resource block, only a portion of the wireless position measurement signal may be transmitted by the base station during the symbol.

Means for performing the functionality at block 515 may comprise one or more components of a computer system, such as a bus 905, processing unit(s) 910, working memory 935, operating system 940, application(s) 945, and/or other components of the computer system 900 illustrated in FIG. 9 and described in more detail below.

At block 520, the base station can determine, for a second occasion of the plurality of occasions, using the pattern formula, the designated symbol for the second occasion having a second ordered position different than the first ordered position. The base station can use the same pattern formula for each subsequent occasion, such that the pattern formula identifies a designated symbol for the second occasion that is different than the designated symbol for the first occasion as described at block 510. As a visual depiction, symbol 1 can be the designated symbol for base station 1 at occasion 304 as described with respect to FIG. 3. The designated symbol (e.g., symbol 1) for the second occasion (e.g., occasion 304) is different than the designated symbol (e.g., symbol 7) for the first occasion (e.g., occasion 302) for the base station (e.g., base station 1) using the pattern formula (e.g., begin at symbol 7 and advance 1 symbol for each subsequent occasion). Stated differently, for example, the second ordered position for the example depicted in FIG. 3 is symbol 1, which is different than the first ordered position of symbol 7.

Means for performing the functionality at block 520 may comprise one or more components of a computer system, such as a bus 905, processing unit(s) 910, working memory 935, operating system 940, application(s) 945, and/or other components of the computer system 900 illustrated in FIG. 9 and described in more detail below.

At block 525, the base station can transmit, during the designated symbol for the second occasion, at least a portion of a second wireless position measurement signal to the mobile device. For example as a visual depiction, base station 1 can transmit signal 322 during symbol 1 at occasion 304 as described with respect to FIG. 3. The signal for the second occasion can be transmitted like the signal for the first occasion as described with respect to block 515. As previously described, each occasion can include multiple slots, and the base stations can each transmit a signal during its designated symbol of each slot during the occasion.

Means for performing the functionality at block 525 may comprise one or more components of a computer system, such as a bus 905, processing unit(s) 910, working memory 935, operating system 940, application(s) 945, and/or other components of the computer system 900 illustrated in FIG. 9 and described in more detail below.

Figure 6:
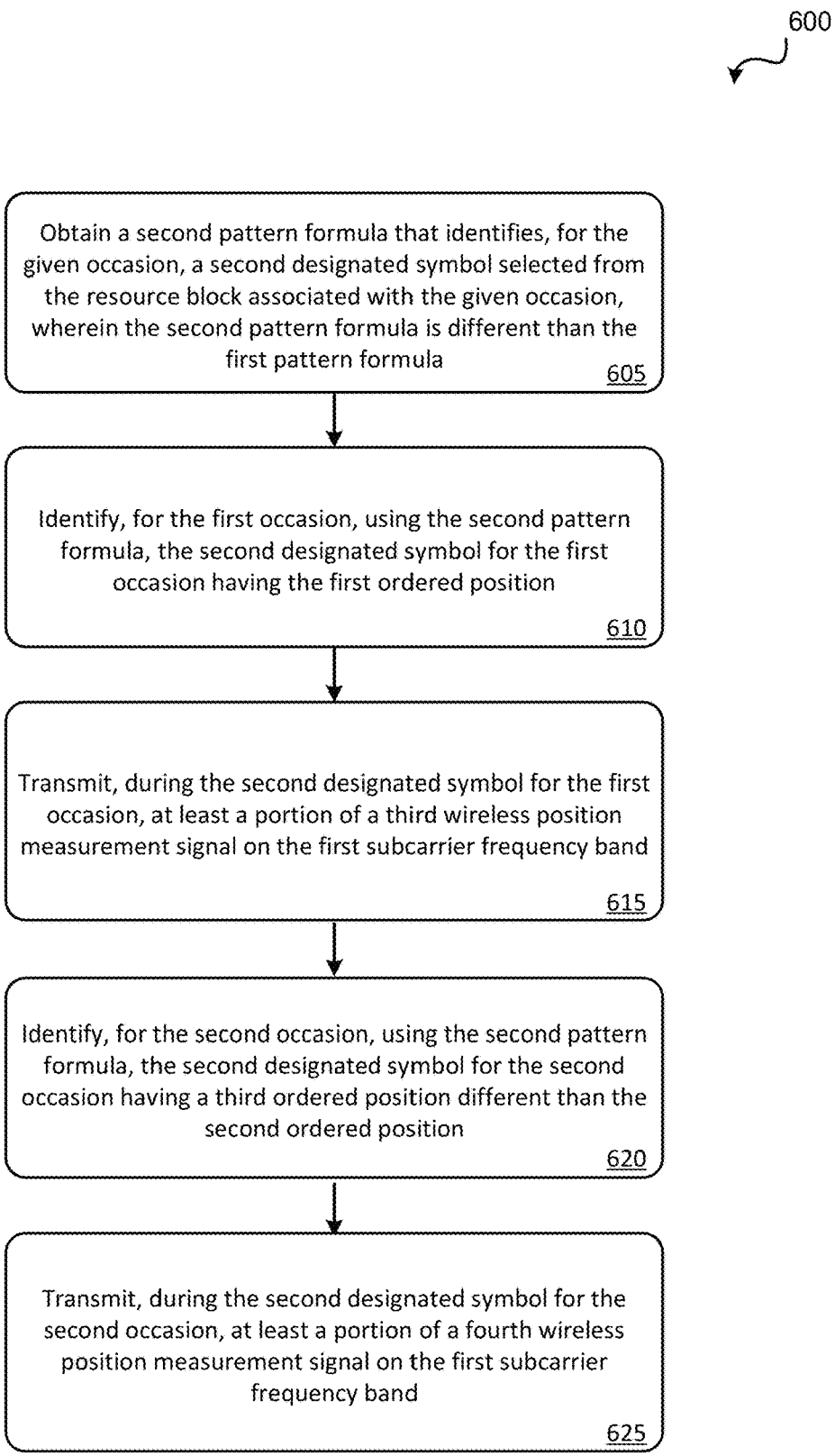
FIG. 6 illustrates another flow diagram of a method for providing a source radio signal using symbol hopping, according to an embodiment.

FIG. 6 illustrates another flow diagram of a method 600 for providing a source radio signal using symbol hopping. The method 600 can be performed by, for example, a base station in a network such as any of gNBs 110 or ng-eNB 114 as described with respect to FIG. 1. The method 600 can be performed by, for example, a neighbor base station to a primary base station, where the primary base station is performing method 500.

Method 600 can begin at block 605 with, for example, a neighbor base station obtaining a second pattern formula that identifies, for the given occasion, a second designated symbol selected from the resource block associated with the given occasion, wherein the second pattern formula is different than the first pattern formula. As discussed with respect to block 505 of FIG. 5, a resource block can comprise a plurality of symbols, each of which are ordered and define a position in the time domain. Each base station can be assigned a symbol and subcarrier frequency for transmitting a signal. The assigned symbol can be determined from a second pattern formula. The second pattern formula can be different than the pattern formula for the primary base station (e.g., by beginning at a different symbol, having a different equation or pattern, or both). The pattern formula can be received from, for example, a location server or other controller or computing device for the network (e.g., 5G network). The pattern formula can identify, for the neighbor base station, during which symbol to transmit for each slot of the occasion. For example, the pattern formula can identify a symbol during which to transmit during each slot of the first occasion and a pattern to follow for each subsequent occasion such that following the pattern formula results in identification, for any given occasion, the symbol during which to transmit. As an example, as described with respect to FIG. 3, base station 2 can have a pattern formula that begins at symbol 7 for the first occasion and advances five (5) symbols at each subsequent occasion.

Means for performing the functionality at block 605 may comprise one or more components of a computer system, such as a bus 905, processing unit(s) 910, working memory 935, operating system 940, application(s) 945, and/or other components of the computer system 900 illustrated in FIG. 9 and described in more detail below.

At block 610, the neighbor base station can determine, for the first occasion, using the second pattern formula, the second designated symbol for the first occasion having the first ordered position. The pattern formula for the neighbor base station can be similar to the pattern formula for the primary base station. For example, the pattern formula can identify a designated symbol at which to transmit during each slot of the first occasion and a pattern to identify the designated symbol at which to transmit at each subsequent occasion. As a visual depiction, symbol 7 can be the designated symbol for base station 2 at occasion 302 as described with respect to FIG. 3. As previously disclosed, the first ordered position for the example depicted in FIG. 3 is symbol 7.

Means for performing the functionality at block 610 may comprise one or more components of a computer system, such as a bus 905, processing unit(s) 910, working memory 935, operating system 940, application(s) 945, and/or other components of the computer system 900 illustrated in FIG. 9 and described in more detail below.

At block 615, the neighbor base station can transmit, during the second designated symbol for the first occasion, at least a portion of a third wireless position measurement signal to the mobile device. Stated differently, once the neighbor base station has determined the designated symbol for the given occasion, during the occasion, the neighbor base station can transmit a signal during the designated symbol. For example as a visual depiction, base station 2 can transmit signal 316 during symbol 7 at occasion 302 as described with respect to FIG. 3. The signal can be a positioning measurement signal or a portion of a positioning measurement signal. The neighbor base station can know when a given occasion for transmitting the position measurement signal begins based on synchronization with a location server or other controller of the network or based on GPS synchronization. Such a location server can provide information regarding the network and location services within the network to base stations within a geographic region and/or user equipment within the geographic region. Further, as previously mentioned, base stations, including neighbor base stations, may transmit position measurement signals for any UE within range to receive. Stated differently, the neighbor base station can broadcast the position measurement signal to any and/or all UEs that are listening for signals transmitted during the given occasion.

Means for performing the functionality at block 615 may comprise one or more components of a computer system, such as a bus 905, processing unit(s) 910, working memory 935, operating system 940, application(s) 945, and/or other components of the computer system 900 illustrated in FIG. 9 and described in more detail below.

At block 620, the neighbor base station can determine, for the second occasion, using the second pattern formula, the second designated symbol for the second occasion having a third ordered position different than the second ordered position. The neighbor base station can use the same (e.g., the second pattern formula) pattern formula for each subsequent occasion, such that the pattern formula identifies a second designated symbol for the second occasion that is different than the second designated symbol for the first occasion as described at block 610, and that is different than the designated symbol for the primary base station at the second occasion. As a visual depiction, symbol 5 can be the designated symbol for base station 2 at occasion 304 as described with respect to FIG. 3. The second designated symbol (e.g., symbol 5) for the second occasion (e.g., occasion 304) is different than the designated symbol (e.g., symbol 1) for the primary base station (e.g., base station 1) at the second occasion (e.g., occasion 304) and is different than the second designated symbol (e.g., symbol 7) for the neighboring base station (e.g., base station 2) at the first occasion (e.g., occasion 302) using the second pattern formula (e.g., begin at symbol 7 and advance 5 symbols for each subsequent occasion). Stated differently, for example, the third ordered position for the example depicted in FIG. 3 is symbol 5, which is different than the first ordered position of symbol 7 and the second ordered position of symbol 1.

Means for performing the functionality at block 620 may comprise one or more components of a computer system, such as a bus 905, processing unit(s) 910, working memory 935, operating system 940, application(s) 945, and/or other components of the computer system 900 illustrated in FIG. 9 and described in more detail below.

At block 625, the neighboring base station can transmit, during the second designated symbol for the second occasion, at least a portion of a fourth wireless position measurement signal to the mobile device. For example as a visual depiction, base station 2 can transmit signal 320 during symbol 5 of each slot of occasion 304 as described with respect to FIG. 3. The signal for the second occasion can be transmitted like the signal for the first occasion as described with respect to block 615.

Means for performing the functionality at block 625 may comprise one or more components of a computer system, such as a bus 905, processing unit(s) 910, working memory 935, operating system 940, application(s) 945, and/or other components of the computer system 900 illustrated in FIG. 9 and described in more detail below.

Figure 7:
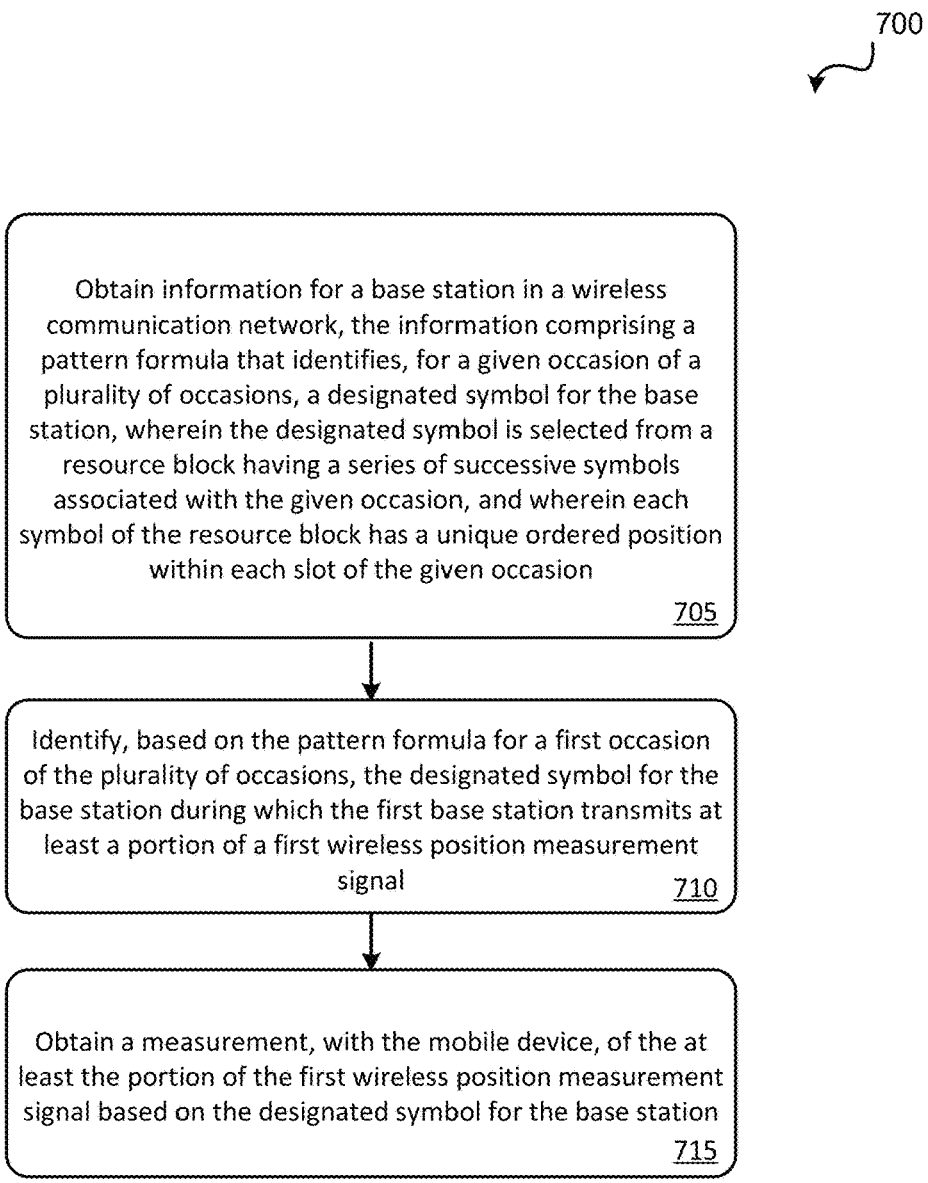
FIG. 7 illustrates a flow diagram of a method for processing a source radio signal using symbol hopping, according to an embodiment.

FIG. 7 illustrates a flow diagram of a method 700 for processing a source radio signal using symbol hopping. The method 700 can be performed by, for example, user equipment such UE 105 as described with respect to FIG. 1. The method 700 can be performed by, for example, a UE in conjunction with, for example, a neighbor base station to a primary base station, where the primary base station is performing method 500 and the neighbor base station is performing method 600. The described symbol hopping herein and the method 700 can provide enhanced detection of wireless position measurement signals from radio signal sources because, as described above, the signals transmitted by the base stations "hop" symbols such that signals transmitted from base stations do not consistently interfere with signals from other base stations because the pattern for transmission from any given base station is different from the pattern for transmission from other base stations. Because of the difference, the UE can receive signals from each base station that are not drown out or interfered with by signals from other base stations during at least some occasions.

Method 700 can begin at block 705 with, for example, a UE obtaining information for a base station in a wireless communication network, the information comprising a pattern formula that identifies, for a given occasion of a plurality of occasions, a designated symbol for the base station, wherein the designated symbol is selected from a resource block having a series of successive symbols associated with the given occasion, and wherein each symbol of the resource block has a unique ordered position within each slot of the given occasion. A UE that may need to determine its position can receive positioning measurement signals from base stations, including a primary base station and neighboring base stations. The UE can obtain a pattern formula to determine when a given base station will transmit a positioning measurement signal. For example, the UE can obtain the pattern formula for base station 1 as described with respect to FIG. 3. The UE can obtain the pattern formula from, for example, the location server or other controller or computing device for the network (e.g., 5G network). The UE can obtain the pattern formula for a base station so that the UE can determine when the UE should listen for positioning measurement signals. As examples, the UE can get the pattern formula for the primary base station and a different pattern formula for each of the neighboring base stations. As described with respect to FIG. 3, the primary base station (base station 1) can have a pattern formula beginning with symbol 7 at the first occasion and advancing one symbol for each subsequent occasion. Further, the neighboring base station (base station 2) can have a pattern formula beginning with symbol 7 at the first occasion and advancing five symbols for each subsequent occasion. The UE can obtain the pattern formulas for each base station from which the UE would like to listen for positioning measurement signals. As described previously, the pattern formula can be used to identify the designated symbol for a given occasion, and each designated symbol is a unique ordered position within each slot of the given occasion.

Figure 8:
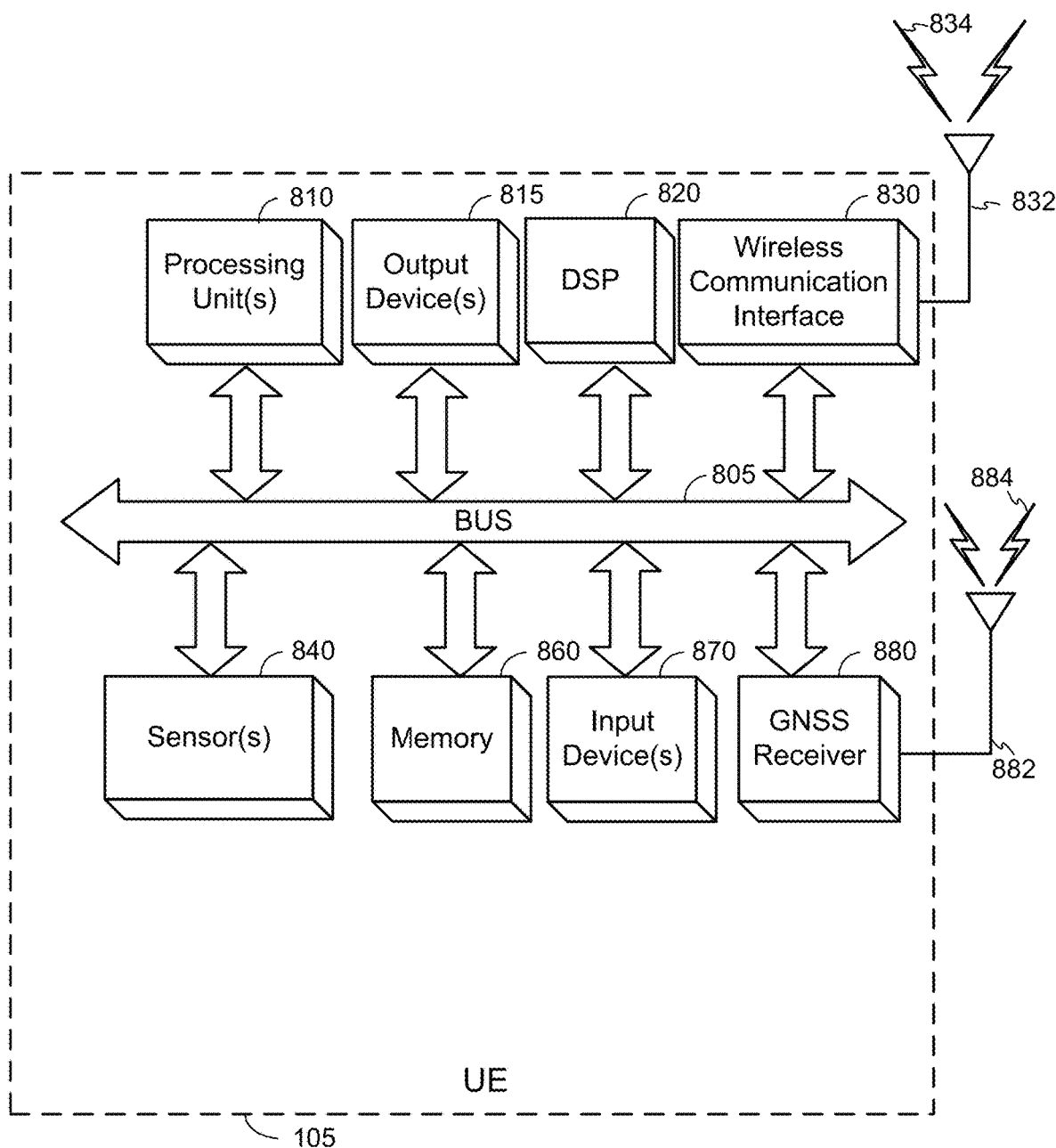
FIG. 8 illustrates an embodiment of a UE.

Means for performing the functions at block 705 may comprise, for example, bus 805, processing unit(s) 810, wireless communication interface 830, memory 860, and/or other hardware and/or software components of a UE 105 as illustrated in FIG. 8 and described in more detail below.

At block 710, the UE can determine, based on the pattern formula for a first occasion of the plurality of occasions, the designated symbol for the base station during which the first base station transmits at least a portion of a first wireless position measurement signal. As an example, the pattern formula for base station 1 as described with respect to FIG. 3 is to identify symbol 7 as the designated symbol for the first occasion and advance one symbol for each subsequent occasion. Accordingly, the UE can determine that at the first occasion, the designated symbol for base station 1 is symbol 7. Determining the designated symbol for the base station can allow the UE to listen for a signal from the base station at the designated symbol. Therefore, when the UE receives a signal at the designated symbol from a base station, the UE has sufficient information to process the signal as, for example, a positioning measurement signal from base station 1.

Means for performing the functions at block 710 may comprise, for example, bus 805, processing unit(s) 810, wireless communication interface 830, memory 860, and/or other hardware and/or software components of a UE 105 as illustrated in FIG. 8 and described in more detail below.

At block 715, the UE can obtain a measurement of the at least a portion of the first wireless position measurement signal based on the designated symbol for the base station. As a visual depiction, the UE can obtain a measurement of signal 318 from base station 1 transmitted during symbol 7 based on the pattern formula for base station 1. The UE can obtain the measurement by, for example, receiving the signal (e.g., signal 318) using, for example, wireless communication interface 830 including antenna 832 as described with respect to FIG. 8. In conjunction with other signals from base station 1 and from other base stations, the UE can determine its position using, for example, OTDOA as described earlier.

Means for performing the functions at block 715 may comprise, for example, bus 805, processing unit(s) 810, wireless communication interface 830, memory 860, and/or other hardware and/or software components of a UE 105 as illustrated in FIG. 8 and described in more detail below.

FIG. 8 illustrates an embodiment of a UE 105, which can be utilized as described herein above (e.g., in association with FIGS. 1-7). For example, the UE 105 can perform one or more of the functions of method 700 of FIG. 7. It should be noted that FIG. 8 is meant only to provide a generalized illustration of various components, any or all of which may be utilized as appropriate. It can be noted that, in some instances, components illustrated by FIG. 8 can be localized to a single physical device and/or distributed among various networked devices, which may be disposed at different physical locations (e.g., located at different parts of a user's body, in which case the components may be communicatively connected via a Personal Area Network (PAN) and/or other means).

The UE 105 is shown comprising hardware elements that can be electrically coupled via a bus 805 (or may otherwise be in communication, as appropriate). The hardware elements may include a processing unit(s) 810, which can include without limitation one or more general-purpose processors, one or more special-purpose processors (such as digital signal processing (DSP) chips, graphics acceleration processors, application specific integrated circuits (ASICs), and/or the like), and/or other processing structure or means. As shown in FIG. 8, some embodiments may have a separate Digital Signal Processor (DSP) 820, depending on desired functionality. Location determination and/or other determinations based on wireless communication may be provided in the processing unit(s) 810 and/or wireless communication interface 830 (discussed below). The UE 105 also can include one or more input devices 870, which can include without limitation a keyboard, touch screen, a touch pad, microphone, button(s), dial(s), switch(es), and/or the like; and one or more output devices 815, which can include without limitation a display, light emitting diode (LED), speakers, and/or the like.

The UE 105 might also include a wireless communication interface 830, which may comprise without limitation a modem, a network card, an infrared communication device, a wireless communication device, a chipset (such as a Bluetooth® device, an IEEE 802.11 device, an IEEE 802.15.4 device, a WiFi device, a WiMax device, cellular communication facilities, and so forth), and/or the like. The wireless communication interface 830 may enable the UE 105 to communicate via the networks described above with regard to FIG. 1. The wireless communication interface 830 may permit data and signaling to be communicated (e.g., transmitted and received) with a network, eNBs, gNBs, ng-eNBs, other network components, computer systems, and/or any other electronic devices described herein. The communication can be carried out via one or more wireless communication antenna(s) 832 that send and/or receive wireless signals 834.

Depending on desired functionality, the wireless communication interface 830 may comprise separate transceivers to communicate with base stations (e.g., ng-eNBs and gNBs) and other terrestrial transceivers, such as wireless devices and access points. The UE 105 may communicate with different data networks that may comprise various network types. For example, a Wireless Wide Area Network (WWAN) may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 802.16) network, and/or so forth. A CDMA network may implement one or more radio access technologies (RATs) such as CDMA2000, Wideband CDMA (WCDMA), and so forth. CDMA2000 includes IS-95, IS-2000, and/or IS-856 standards. A TDMA network may implement GSM, Digital Advanced Mobile Phone System (D-AMPS), or some other RAT. An OFDMA network may employ LTE, LTE Advanced, 5G NR, and so forth. 5G NR, LTE, LTE Advanced, GSM, and WCDMA are described in documents from the Third Generation Partnership Project (3GPP). CDMA2000 is described in documents from a consortium named "3rd Generation Partnership Project 2" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN, and/or WPAN.

The UE 105 can further include sensor(s) 840. Sensors 840 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and/or the like), some of which may be used to complement and/or facilitate the position determination described herein.

Embodiments of the UE 105 may also include a GNSS receiver 880 capable of receiving signals 884 from one or more GNSS satellites (e.g., SVs 190) using an antenna 882 (which could be the same as antenna 832). Positioning based on GNSS signal measurement can be utilized to complement and/or incorporate the techniques described herein. The GNSS receiver 880 can extract a position of the UE 105 using conventional techniques from GNSS SVs of a GNSS system, such as Global Positioning System (GPS), Galileo, Glonass, Quasi-Zenith Satellite System (QZSS) over Japan, Indian Regional Navigational Satellite System (IRNSS) over India, Beidou over China, and/or the like. Moreover, the GNSS receiver 880 can be used with various augmentation systems (e.g., a Satellite Based Augmentation System (SBAS)) that may be associated with or otherwise enabled for use with one or more global and/or regional navigation satellite systems, such as, for example, Wide Area Augmentation System (WAAS), European Geostationary Navigation Overlay Service (EGNOS), Multi-functional Satellite Augmentation System (MSAS), Geo Augmented Navigation system (GAGAN), and/or the like.

The UE 105 may further include and/or be in communication with a memory 860. The memory 860 can include, without limitation, local and/or network accessible storage, a disk drive, a drive array, an optical storage device, a solid-state storage device, such as a random access memory (RAM) and/or a read-only memory (ROM), any of which can be programmable, flash-updateable, and/or the like. Such storage devices may be configured to implement any appropriate data stores, including without limitation, various file systems, database structures, and/or the like.

The memory 860 of the UE 105 also can comprise software elements (not shown in FIG. 8), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 860 that are executable by the UE 105 (and/or processing unit(s) 810 or DSP 820 within UE 105). In an aspect, then, such code and/or instructions can be used to configure and/or adapt a general purpose computer (or other device) to perform one or more operations in accordance with the described methods.

Figure 9:
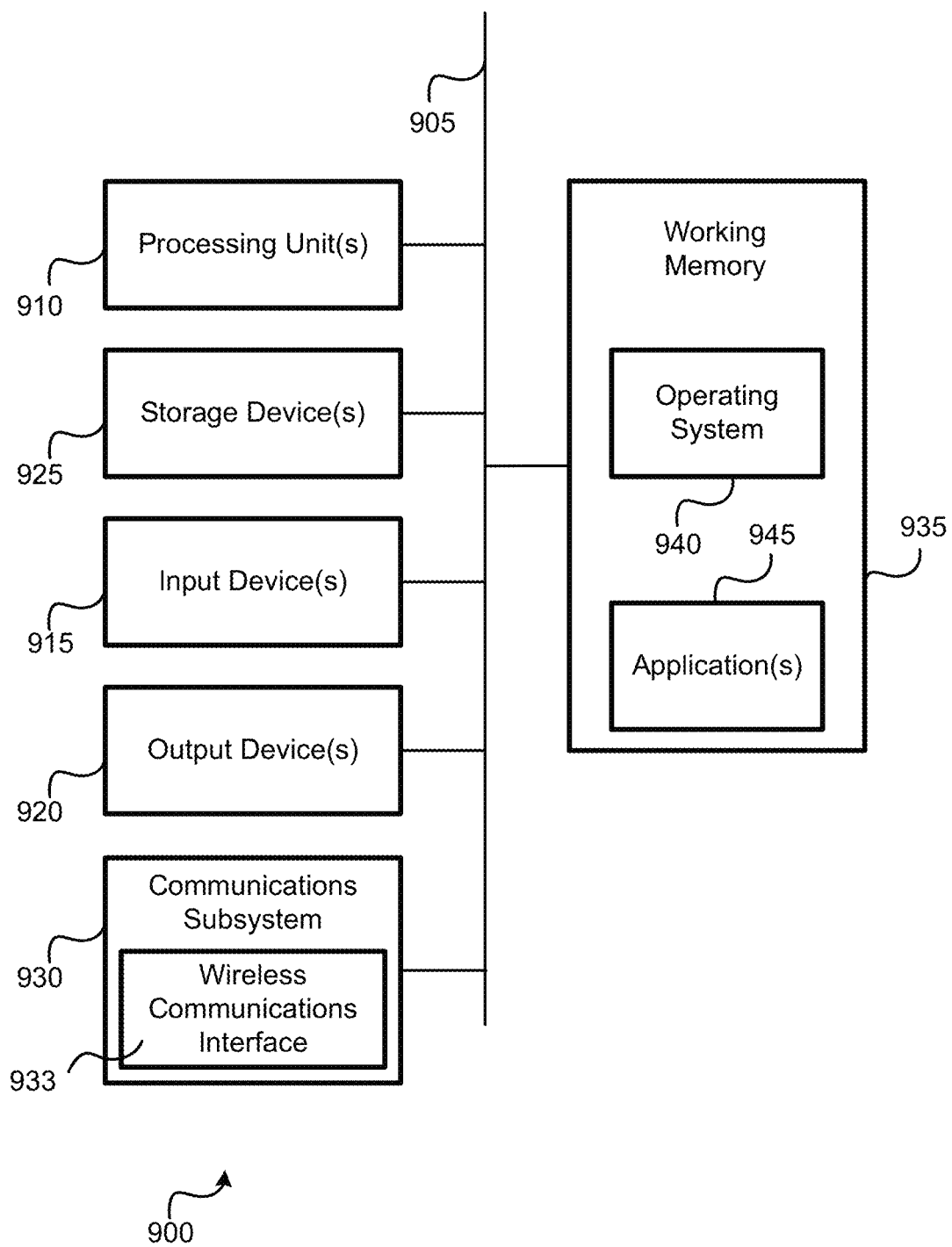
FIG. 9 illustrates an embodiment of a computer system.

FIG. 9 illustrates an embodiment of a computer system 900, which may be utilized and/or incorporated into one or more components of a communication system (e.g., communication system 100 of FIG. 1), including various components of a 5G network, such as the NG-RAN 135 and 5GC 140, and/or similar components of other network types. FIG. 9 provides a schematic illustration of one embodiment of a computer system 900 that can perform the methods provided by various other embodiments, such as the methods described in relation to FIGS. 5 and 6. It should be noted that FIG. 9 is meant only to provide a generalized illustration of various components, any or all of which may be utilized as appropriate. FIG. 9, therefore, broadly illustrates how individual system elements may be implemented in a relatively separated or relatively more integrated manner. In addition, it can be noted that components illustrated by FIG. 9 can be localized to a single device and/or distributed among various networked devices, which may be disposed at different physical or geographical locations. In some embodiments, the computer system 900 may correspond to an LMF (e.g., LMF 120 of FIG. 1), a gNB (e.g., gNBs 110 of FIG. 1), an ng-eNB (e.g., ng-eNB 114 of FIG. 1), an eNB, an E-SMLC, a SUPL SLP, and/or some other type of location-capable device.

The computer system 900 is shown comprising hardware elements that can be electrically coupled via a bus 905 (or may otherwise be in communication, as appropriate). The hardware elements may include processing unit(s) 910, which can include without limitation one or more general-purpose processors, one or more special-purpose processors (such as digital signal processing chips, graphics acceleration processors, and/or the like), and/or other processing structure, which can be configured to perform one or more of the methods described herein, including the methods described in relation to FIG. 5 or 6. The computer system 900 also can include one or more input devices 915, which can include without limitation a mouse, a keyboard, a camera, a microphone, and/or the like; and one or more output devices 920, which can include without limitation a display device, a printer, and/or the like.

The computer system 900 may further include (and/or be in communication with) one or more non-transitory storage devices 925, which can comprise, without limitation, local and/or network accessible storage, and/or can include, without limitation, a disk drive, a drive array, an optical storage device, a solid-state storage device (e.g., a random access memory (RAM) and/or a read-only memory (ROM)), any of which can be programmable, flash-updateable, and/or the like. Such storage devices may be configured to implement any appropriate data stores, including without limitation, various file systems, database structures, and/or the like.

The computer system 900 may also include a communications subsystem 930, which can include support of wireline communication technologies and/or wireless communication technologies (in some embodiments) managed and controlled by a wireless communication interface 933. The communications subsystem 930 may include a modem, a network card (wireless or wired), an infrared communication device, a wireless communication device, and/or a chipset, and/or the like. The communications subsystem 930 may include one or more input and/or output communication interfaces, such as the wireless communication interface 933, to permit data and signaling to be exchanged with a network, mobile devices, other computer systems, and/or any other electronic devices described herein. Note that the terms "mobile device" and "UE" are used interchangeably herein to refer to any mobile communications device such as, but not limited to, mobile phones, smartphones, wearable devices, mobile computing devices (e.g., laptops, PDAs, tablets), embedded modems, and automotive and other vehicular computing devices.

In many embodiments, the computer system 900 will further comprise a working memory 935, which can include a RAM and/or ROM device. Software elements, shown as being located within the working memory 935, can include an operating system 940, device drivers, executable libraries, and/or other code, such as application(s) 945, which may comprise computer programs provided by various embodiments, and/or may be designed to implement methods, and/or configure systems, provided by other embodiments, as described herein. Merely by way of example, one or more procedures described with respect to the method(s) discussed above, such as the methods described in relation to FIGS. 5 and 6, may be implemented as code and/or instructions that are stored (e.g., temporarily) in working memory 935 and are executable by a computer (and/or a processing unit within a computer such as processing unit(s) 910); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 925 described above. In some cases, the storage medium might be incorporated within a computer system, such as computer system 900. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 900 (e.g., by processing unit(s) 910) and/or might take the form of source and/or installable code, which, upon compilation and/or installation on the computer system 900 (e.g., using any of a variety of generally available compilers, installation programs, compression/decompression utilities, and so forth), then takes the form of executable code.

Figure 10:
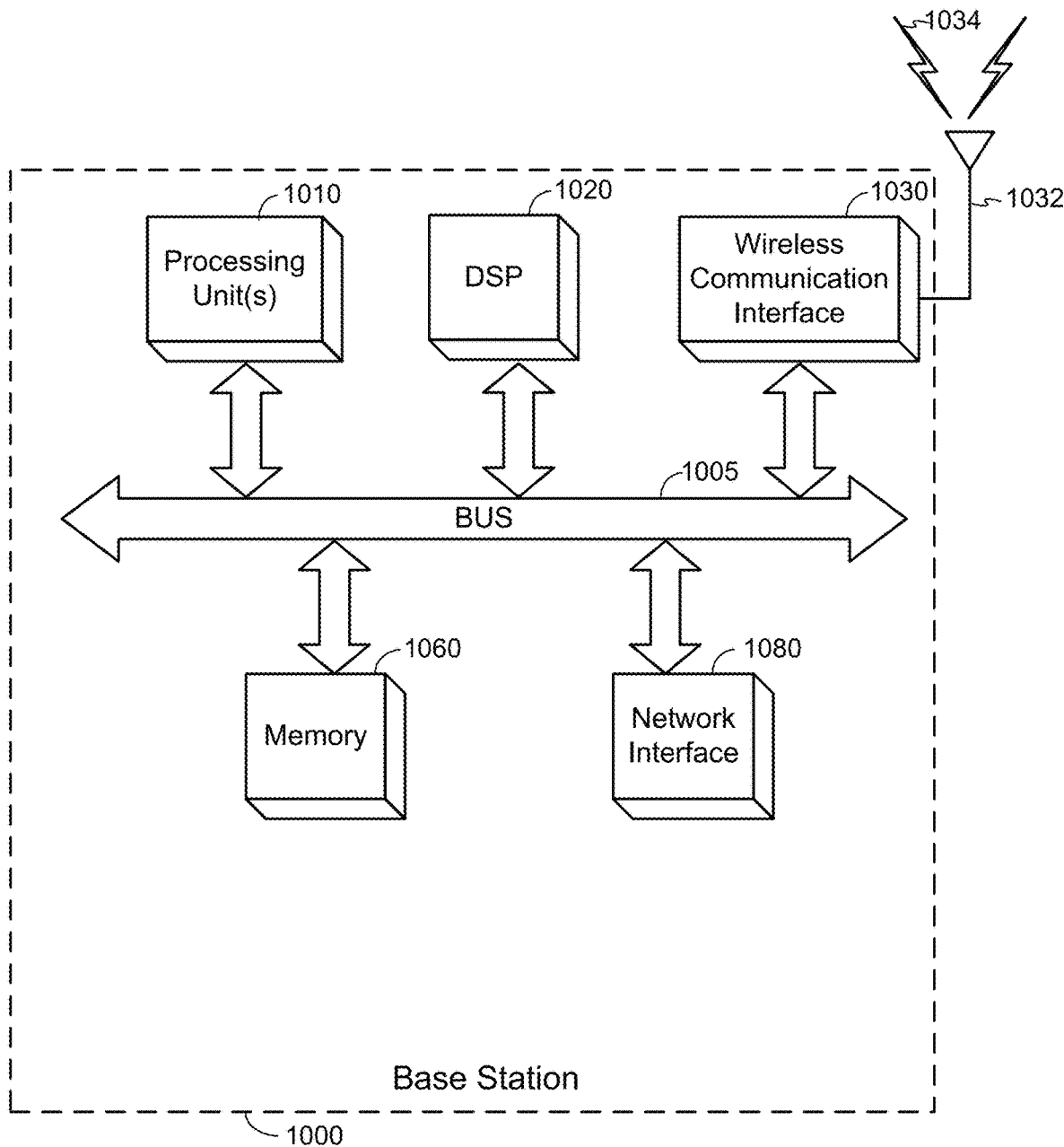
FIG. 10 illustrates an embodiment of a base station.

FIG. 10 illustrates an embodiment of a base station 1000, which can be utilized as described herein above (e.g., in association with FIGS. 1-7). For example, the base station 1000 can perform one or more of the functions of methods 500 of FIG. 5 and 600 of FIG. 6. It should be noted that FIG. 10 is meant only to provide a generalized illustration of various components, any or all of which may be utilized as appropriate. In some embodiments, the base station 1000 may correspond to an LMF 120, a gNB 110, and/or an ng-eNB 114 as described herein above.

The base station 1000 is shown comprising hardware elements that can be electrically coupled via a bus 1005 (or may otherwise be in communication, as appropriate). The hardware elements may include a processing unit(s) 1010 which can include without limitation one or more general-purpose processors, one or more special-purpose processors (such as digital signal processing (DSP) chips, graphics acceleration processors, application specific integrated circuits (ASICs), and/or the like), and/or other processing structure or means. As shown in FIG. 10, some embodiments may have a separate Digital Signal Processor (DSP) 1020, depending on desired functionality. Location determination and/or other determinations based on wireless communication may be provided in the processing unit(s) 1010 and/or wireless communication interface 1030 (discussed below). The base station 1000 also can include one or more input devices 1070, which can include without limitation a keyboard, display, mouse, microphone, button(s), dial(s), switch(es), and/or the like; and one or more output devices 1015, which can include without limitation a display, light emitting diode (LED), speakers, and/or the like.

The base station 1000 might also include a wireless communication interface 1030, which may comprise without limitation a modem, a network card, an infrared communication device, a wireless communication device, and/or a chipset (such as a Bluetooth® device, an IEEE 802.11 device, an IEEE 802.15.4 device, a WiFi device, a WiMax device, cellular communication facilities, etc.), and/or the like, which may enable the base station 1000 to communicate as described herein. The wireless communication interface 1030 may permit data and signaling to be communicated (e.g., transmitted and received) UEs, other base stations (e.g., eNBs, gNBs, and ng-eNBs), and/or other network components, computer systems, and/or any other electronic devices described herein. The communication can be carried out via one or more wireless communication antenna(s) 1032 that send and/or receive wireless signals 1034.

The base station 1000 may also include a network interface 1080, which can include support of wireline communication technologies. The network interface 1080 may include a modem, network card, chipset, and/or the like. The network interface 1080 may include one or more input and/or output communication interfaces to permit data to be exchanged with a network, communication network servers, computer systems, and/or any other electronic devices described herein.

In many embodiments, the base station 1000 will further comprise a memory 1060. The memory 1060 can include, without limitation, local and/or network accessible storage, a disk drive, a drive array, an optical storage device, a solid-state storage device, such as a RAM, and/or a ROM, which can be programmable, flash-updateable, and/or the like. Such storage devices may be configured to implement any appropriate data stores, including without limitation, various file systems, database structures, and/or the like.

The memory 1060 of the base station 1000 also can comprise software elements (not shown in FIG. 10), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1060 that are executable by the base station 1000 (and/or processing unit(s) 1010 or DSP 1020 within base station 1000). In an aspect, then, such code and/or instructions can be used to configure and/or adapt a general purpose computer (or other device) to perform one or more operations in accordance with the described methods.

In some embodiments a processor readable memory device, such as memory 1060 of FIG. 10 may have software code or programming instructions stored such that when a processor, such processing unit 1010 of FIG. 10, executes the programming instructions or software code, the processor may obtain a pattern formula that identifies, for a given occasion of a plurality of occasions, a designated symbol selected from a resource block having a series of successive symbols associated with the given occasion, wherein each symbol of the resource block has a unique ordered position within each slot of the given occasion. The processor may also identify, for a first occasion of the plurality of occasions, using the pattern formula, the designated symbol for the first occasion having a first ordered position. The processor may further transmit, during the designated symbol for the first occasion, at least a portion of a first wireless position measurement signal on a first subcarrier frequency band of a plurality of subcarrier frequency bands. The processor may also identify, for a second occasion of the plurality of occasions, using the pattern formula, the designated symbol for the second occasion having a second ordered position different than the first ordered position. The processor may also transmit, during the designated symbol for the second occasion, at least a portion of a second wireless position measurement signal on the first subcarrier frequency band.

In some embodiments, an apparatus, such as base station 1000 of FIG. 10 may include means for performing actions such as a memory (e.g., memory 1060) with processing instructions stored on the memory that may be executed by a processor, such as processing unit 1010, which when executed cause the apparatus to obtain a pattern formula that identifies, for a given occasion of a plurality of occasions, a designated symbol selected from a resource block having a series of successive symbols associated with the given occasion, wherein each symbol of the resource block has a unique ordered position within each slot of the given occasion; identify, for a first occasion of the plurality of occasions, using the pattern formula, the designated symbol for the first occasion having a first ordered position; transmit, during the designated symbol for the first occasion, at least a portion of a first wireless position measurement signal on a first subcarrier frequency band of a plurality of subcarrier frequency bands; identify, for a second occasion of the plurality of occasions, using the pattern formula, the designated symbol for the second occasion having a second ordered position different than the first ordered position; and transmit, during the designated symbol for the second occasion, at least a portion of a second wireless position measurement signal on the first subcarrier frequency band.

In some embodiments a processor readable memory device, such as memory 860 of FIG. 8 may have software code or programming instructions stored such that when a processor, such processing unit 810 of FIG. 8, executes the programming instructions or software code, the processor may obtain information for a base station in a wireless communication network, the information comprising a pattern formula that identifies, for a given occasion of a plurality of occasions, a designated symbol for the base station, wherein the designated symbol is selected from a resource block having a series of successive symbols associated with the given occasion, and wherein each symbol of the resource block has a unique ordered position within each slot of the given occasion. The processor may also identify, based on the pattern formula for a first occasion of the plurality of occasions, the designated symbol for the base station during which the base station transmits at least a portion of a first wireless position measurement signal. The processor may further obtain a measurement of the at least the portion of the first wireless position measurement signal based on the designated symbol for the base station.

In some embodiments, an apparatus, such as UE 105 of FIG. 8 may include means for performing actions such as a memory (e.g., memory 860) with processing instructions stored on the memory that may be executed by a processor, such as processing unit 810, which when executed cause the apparatus to obtain information for a base station in a wireless communication network, the information comprising a pattern formula that identifies, for a given occasion of a plurality of occasions, a designated symbol for the base station, wherein the designated symbol is selected from a resource block having a series of successive symbols associated with the given occasion, and wherein each symbol of the resource block has a unique ordered position within each slot of the given occasion; identify, based on the pattern formula for a first occasion of the plurality of occasions, the designated symbol for the base station during which the base station transmits at least a portion of a first wireless position measurement signal, and obtain a measurement of the at least the portion of the first wireless position measurement signal based on the designated symbol for the base station It will be apparent to those skilled in the art that substantial variations may be made in accordance with specific requirements. For example, customized hardware might also be used and/or particular elements might be implemented in hardware, software (including portable software, such as applets or the like), or both. Further, connection to other computing devices, such as network input/output devices, may be employed.

With reference to the appended figures, components that can include memory can include non-transitory machine-readable media. The terms "machine-readable medium," "computer-readable medium," "computer-readable memory device," and "machine readable media" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, punchcards, papertape, any other physical medium with patterns of holes, RAM, PROM, EPROM, EEPROM, FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples. For example, future networks beyond fifth generation (5G) networks may implement embodiments herein.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that, throughout this Specification, discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device. It is understood that a general purpose computer can become a special purpose computer by virtue of installation and execution of software/code/executable instructions that perform such above described actions or processes, such as, for example, the methods described in FIGS. 5-7.

The terms "and" and "or" as used herein may include a variety of meanings that may depend, at least in part, upon the context in which such terms are used. Typically, the term "or," if used to associate a list (e.g., A, B, or C), is intended to (and may) mean A, B, and C, here used in the inclusive sense, as well as A, B, or C, here used in the exclusive sense. Similarly, the term "and," if used to associate a list (e.g., A, B, and C), is intended to (and may) mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, and so forth.

Having described several embodiments, it is understood that various modifications, alternative constructions, and equivalents may be used without departing from the spirit of this disclosure. For example, the above elements may merely be a component of a larger system, wherein, for example, other rules may take precedence over or otherwise modify the application of the various embodiments. Also, a number of steps may be undertaken before, during, or after the above elements are considered. Accordingly, the above description does not limit the scope of the disclosure.

The embodiments described herein are not intended to be mutually exclusive. While not every combination of features is explicitly described, the person of ordinary skill will understand that some features described in the various embodiments are optional and/or may be combined with features described in other embodiments. Further, the person of ordinary skill will understand that some features described in the various embodiments may not be combined with features described in other embodiments. Further, the person of ordinary skill will understand that some features described the various embodiments may not be combined with features described in other embodiments if the features conflict.

What is claimed is:

1. A method for reducing collisions in transmitted wireless position measurement signals, the method comprising:
    obtaining, by a base station, a pattern formula that identifies, for a given occasion of a plurality of occasions, a designated symbol selected from a resource block having a series of successive symbols associated with the given occasion, wherein each symbol of the resource block has a unique ordered position within each slot of the given occasion, and wherein each positioning occasion of the plurality of occasions comprises a number of consecutive positioning sub-frames and the plurality of occasions occur periodically at intervals from the base station;
    identifying, by the base station, for a first occasion of the plurality of occasions, using the pattern formula, the designated symbol for the first occasion having a first ordered position;
    transmitting, by the base station, during the designated symbol for the first occasion, at least a portion of a first wireless position measurement signal on a first subcarrier frequency band of a plurality of subcarrier frequency bands;
    identifying, by the base station, for a second occasion of the plurality of occasions, using the pattern formula, the designated symbol for the second occasion having a second ordered position different than the first ordered position; and
    transmitting, by the base station, during the designated symbol for the second occasion, at least a portion of a second wireless position measurement signal on the first subcarrier frequency band.

2. The method of claim 1, wherein the pattern formula is an equation and wherein identifying the designated symbol comprises solving the equation.

3. The method of claim 1, wherein the pattern formula is based on a physical cell identifier (PCI) of the base station.

4. The method of claim 1, wherein the pattern formula is based on a global cell identifier (GCI) of the base station.

5. The method of claim 1, wherein the pattern formula is based, at least in part, on an occasion number.

6. The method of claim 1, wherein the base station is a serving base station and the pattern formula is a first pattern formula, the method further comprising:
    obtaining, by a neighbor base station, a second pattern formula that identifies, for the given occasion, a second designated symbol selected from the resource block associated with the given occasion, wherein the second pattern formula is different than the first pattern formula;
    identifying, by the neighbor base station for the first occasion, using the second pattern formula, the second designated symbol for the first occasion having the first ordered position;
    transmitting, by the neighbor base station during the second designated symbol for the first occasion, at least a portion of a third wireless position measurement signal on the first subcarrier frequency band;
    identifying, by the neighbor base station for the second occasion, using the second pattern formula, the second designated symbol for the second occasion having a third ordered position different than the second ordered position; and
    transmitting, by the neighbor base station during the second designated symbol for the second occasion, at least a portion of a fourth wireless position measurement signal on the first subcarrier frequency band.

7. The method of claim 1, wherein the base station is a serving base station, the first occasion has a first temporal boundary aligned with the serving base station, the second occasion has a second temporal boundary aligned with the serving base station, and the pattern formula is a first pattern formula, the method further comprising:
    obtaining, by a neighbor base station, a second pattern formula that identifies, for the given occasion, a second designated symbol selected from the resource block associated with the given occasion, wherein the second pattern formula is different than the first pattern formula;

identifying, by the neighbor base station for the first occasion, using the second pattern formula, the second designated symbol for the first occasion having a third ordered position;

transmitting, by the neighbor base station during the second designated symbol for the first occasion, at least a portion of a third wireless position measurement signal on the first subcarrier frequency band, wherein the at least the portion of the third wireless position measurement signal is transmitted outside the first temporal boundary;

identifying, by the neighbor base station for the second occasion, using the second pattern formula, the second designated symbol for the second occasion having a fourth ordered position; and transmitting, by the neighbor base station during the second designated symbol for the second occasion, at least a portion of a fourth wireless position measurement signal on the first subcarrier frequency band, wherein the at least the portion of the fourth wireless position measurement signal is transmitted within the second temporal boundary.

8. The method of claim 1, wherein the first occasion begins at an anchor point in time of a common timeframe known by each of the base station and a receiving device.

9. The method of claim 8, wherein the at least the portion of the first wireless position measurement signal is transmitted via a wireless communication network and wherein the common timeframe is aligned with a system frame number of the wireless communication network.

10. The method of claim 8, wherein the common timeframe is based on global positioning system time.

11. A method for enhanced detection of wireless position measurement signals from multiple base stations at a mobile device, the method comprising:

obtaining, at the mobile device, information for a base station in a wireless communication network, the information comprising a pattern formula that identifies, for a given occasion of a plurality of occasions, a designated symbol for the base station, wherein the designated symbol is selected from a resource block having a series of successive symbols associated with the given occasion, and wherein each symbol of the resource block has a unique ordered position within each slot of the given occasion, and wherein each positioning occasion of the plurality of occasions comprises a number of consecutive positioning sub-frames and the plurality of occasions occur periodically at intervals from the base station;

identifying, at the mobile device based on the pattern formula for a first occasion of the plurality of occasions, the designated symbol for the base station in a first base station transmission comprising at least a portion of a first wireless position measurement signal on a first subcarrier frequency band of a plurality of subcarrier frequency bands, wherein the designated symbol for the first occasion having a first ordered position;

identifying, at the mobile device based on the pattern formula for a second occasion of the plurality of occasions, the designated symbol for the base station in a second base station transmission comprising at least a portion of a second wireless position measurement signal on the first subcarrier frequency band, wherein the designated symbol for the second occasion having a second ordered position different than the first ordered position; and taking a measurement, with the mobile device, of the at least the portion of the first and the second wireless position measurement signal based on the designated symbol for the base station.

12. The method of claim 11, further comprising:
identifying the first subcarrier frequency band of the plurality of subcarrier frequency bands on which the base station transmits; and
wherein taking the measurement of the at least the portion of the first and the second wireless position measurement signal comprises taking the measurement of the at least the portion of the first and the second wireless position measurement signal on the subcarrier frequency band based on the respective designated symbol for the base station.

13. The method of claim 11, wherein the pattern formula is an equation and wherein identifying the designated symbol comprises solving the equation.

14. The method of claim 11, wherein the pattern formula is based on a physical cell identifier (PCI) of the base station.

15. The method of claim 11, wherein the pattern formula is based on a global cell identifier (GCI) of the base station.

16. The method of claim 11, wherein the pattern formula is based, at least in part, on an occasion number.

17. The method of claim 11, wherein the first occasion begins at an anchor point in time of a common timeframe known by each of the base station and the mobile device.

18. The method of claim 17, wherein the common timeframe is aligned with a system frame number of the wireless communication network.

19. The method of claim 17, wherein the common timeframe is based on global positioning system time.

20. A base station for reducing collisions in transmitted wireless position measurement signals, the base station comprising:

a memory; and one or more processing units coupled to the memory, wherein the one or more processing units are configured to:

obtain a pattern formula that identifies, for a given occasion of a plurality of occasions, a designated symbol selected from a resource block having a series of successive symbols associated with the given occasion, wherein each symbol of the resource block has a unique ordered position within each slot of the given occasion, and wherein each positioning occasion of the plurality of occasions comprises a number of consecutive positioning sub-frames and the plurality of occasions occur periodically at intervals from the base station;

identify, for a first occasion of the plurality of occasions, using the pattern formula, the designated symbol for the first occasion having a first ordered position;

transmit, during the designated symbol for the first occasion, at least a portion of a first wireless position measurement signal on a first subcarrier frequency band of a plurality of subcarrier frequency bands;

identify, for a second occasion of the plurality of occasions, using the pattern formula, the designated symbol for the second occasion having a second ordered position different than the first ordered position; and transmit, during the designated symbol for the second occasion, at least a portion of a second wireless position measurement signal on the first subcarrier frequency band.

21. The base station of claim 20, wherein the pattern formula is an equation and wherein identifying the designated symbol comprises solving the equation.

22. The base station of claim 20, wherein the pattern formula is based on a physical cell identifier (PCI) of the base station.

23. The base station of claim 20, wherein the pattern formula is based on a global cell identifier (GCI) of the base station.

24. The base station of claim 20, wherein the pattern formula is based, at least in part, on an occasion number.

25. The base station of claim 20, wherein the first occasion begins at an anchor point in time of a common timeframe known by each of the base station and a receiving device.

26. The base station of claim 25, wherein the at least the portion of the first wireless position measurement signal is transmitted via a wireless communication network and wherein the common timeframe is aligned with a system frame number of the wireless communication network.

27. The base station of claim 25, wherein the common timeframe is based on global positioning system time.

28. A mobile device configured for enhanced detection of wireless position measurement signals from multiple base stations, the mobile device comprising:
   a memory;
   a wireless communication interface; and
   one or more processing units coupled to the memory and the wireless communication interface, wherein the one or more processing units are configured to:
      obtain information for a base station in a wireless communication network, the information comprising a pattern formula that identifies, for a given occasion of a plurality of occasions, a designated symbol for the base station, wherein the designated symbol is selected from a resource block having a series of successive symbols associated with the given occasion, and wherein each symbol of the resource block has a unique ordered position within each slot of the given occasion, and wherein each positioning occasion of the plurality of occasions comprises a number of consecutive positioning sub-frames and the plurality of occasions occur periodically at intervals from the base station;
      identify, based on the pattern formula for a first occasion of the plurality of occasions, the designated symbol for the base station in a first base station transmission comprising at least a portion of a first wireless position measurement signal on a first subcarrier frequency band of a plurality of subcarrier frequency bands, wherein the designated symbol for the first occasion having a first ordered position;
      identify, based on the pattern formula for a second occasion of the plurality of occasions, the designated symbol for the base station in a second base station transmission comprising at least a portion of a second wireless position measurement signal on the first subcarrier frequency band, wherein the designated symbol for the second occasion having a second ordered position different than the first ordered position; and
      obtain a measurement of the at least the portion of the first and the second wireless position measurement signal based on the designated symbol for the base station.

29. The mobile device of claim 28, wherein the pattern formula is an equation and wherein identifying the designated symbol comprises solving the equation.

30. The mobile device of claim 28, wherein the pattern formula is based on a physical cell identifier (PCI) of the base station.

31. The mobile device of claim 28, wherein the pattern formula is based on a global cell identifier (GCI) of the base station.

32. The mobile device of claim 28, wherein the first occasion begins at an anchor point in time of a common timeframe known by each of the base station and the mobile device.

33. The mobile device of claim 32, wherein the common timeframe is aligned with a system frame number of the wireless communication network.

34. The mobile device of claim 32, wherein the common timeframe is based on global positioning system time.

* * * * *